(12) United States Patent
Sakamoto et al.

(10) Patent No.: US 7,709,594 B2
(45) Date of Patent: May 4, 2010

(54) POLYESTER RESIN COMPOSITIONS, CATALYST FOR POLYESTER PRODUCTION, POLYESTER FILM, AND MAGNETIC RECORDING MEDIUM

(75) Inventors: Jun Sakamoto, Mishima (JP); Masatoshi Aoyama, Mishima (JP); Yoshihiro Honma, Mishima (JP); Hitoshi Yoshimura, Mishima (JP); Yuzo Shimizu, Shizuoka (JP)

(73) Assignee: TORAY Industries, Inc., Tokyo (JP)

( * ) Notice: Subject to any disclaimer, the term of this patent is extended or adjusted under 35 U.S.C. 154(b) by 14 days.

(21) Appl. No.: 10/529,847

(22) PCT Filed: Oct. 3, 2003

(86) PCT No.: PCT/JP03/12708

§ 371 (c)(1),
(2), (4) Date: Jun. 13, 2005

(87) PCT Pub. No.: WO2004/031258

PCT Pub. Date: Apr. 15, 2004

(65) Prior Publication Data

US 2005/0239929 A1    Oct. 27, 2005

(30) Foreign Application Priority Data

Oct. 3, 2002    (JP) ............................. 2002-291092
Dec. 2, 2002   (JP) ............................. 2002-349521

(51) Int. Cl.
*C08G 63/02*    (2006.01)
*C08G 63/82*    (2006.01)

(52) U.S. Cl. ............... 528/279; 524/399; 524/706; 524/710; 524/713; 524/785; 528/275; 528/280; 528/285; 528/295; 528/302

(58) Field of Classification Search .................. None
See application file for complete search history.

(56) References Cited

U.S. PATENT DOCUMENTS

| 5,684,116 | A | 11/1997 | Martl et al. | 528/176 |
| 6,365,659 | B1 | 4/2002 | Aoyama et al. | 524/399 |
| 6,670,030 | B1 * | 12/2003 | Uchida et al. | 428/323 |
| 6,680,353 | B1 * | 1/2004 | Kato et al. | 524/497 |

FOREIGN PATENT DOCUMENTS

WO    WO 97/47675    * 12/1997

* cited by examiner

*Primary Examiner*—Vasu Jagannathan
*Assistant Examiner*—Gennadiy Mesh
(74) *Attorney, Agent, or Firm*—Kubovcik & Kubovcik

(57) ABSTRACT

A polyester composition produced without using an antimony compound as a polycondensation catalyst and including (I) composition containing, on a weight basis, 30 ppm or less of antimony, 0.5 to 50 ppm of titanium, and 0.1 to 100 ppm of phosphorus, in which the number density of titanium-containing particles, the equivalent circular diameter of which is 1μm or more, is less than 100/0.02 mg; and (II) a composition containing, on a weight basis, antimony, titanium and phosphorous as defined above, in which organic polymer particles are contained in amount of 0.1 to 5 wt%, the organic polymer particles having an average particle diameter determined by dynamic light scattering of 0.05 to 3μm and containing 0.01% or less of coarse particles relative to the total number of the particles, the coarse particles having a diameter at least twice the average particle diameter.

9 Claims, No Drawings

POLYESTER RESIN COMPOSITIONS, CATALYST FOR POLYESTER PRODUCTION, POLYESTER FILM, AND MAGNETIC RECORDING MEDIUM

This application is a 371 of international application PCT/JP2003/012708, which claims priority based on Japanese patent application Nos. 2002-291092 and 2002-349521 filed Oct. 3 and Dec. 2, 2002, respectively, which are incorporated herein by reference.

TECHNICAL FIELD

The present invention relates to polyester resin compositions, catalysts for producing polyesters, polyester films, and magnetic recording media.

BACKGROUND ART

Polyesters, in particular, polyethylene terephthalate, have excellent mechanical properties, such as crystallinity and strength, chemical resistance, thermal properties, electrical properties, and transparency, and are thus used in various industrial applications, such as films, fibers, bottles, and extrusion-molded products. The demand therefor is growing. In particular, polyesters are used in the field of film applications, for example, magnetic recording applications, agricultural applications, packaging applications, capacitor applications, and construction materials applications where there are massive demands, due to their superior mechanical properties and economic efficiency.

For example, polyethylene terephthalate is produced from ethylene glycol and terephthalic acid or its ester-forming derivative. In general, commercial processes for producing polymers with high molecular weight commonly use antimony-based compounds as polycondensation catalysts.

However, antimony-based compounds have the following problems.

For example, antimony-based compounds partly evaporate and dissipate during polymer melting processes and their residues deposit around the dies and induce surface defects in films.

Antimony-based compounds tend to form relatively large particles in polymers and thus cause an increased filtration pressure at filters, surface defects in films during film-making, and breaking of films under severe conditions.

Use of antimony-based compounds impairs the stability of particles added to polymers, thereby causing agglomeration of particles. This results in decreased quality, such as generation of coarse projections in surfaces, and decreased operation efficiency due to increased filtration pressures at filters, as described above.

Accordingly polyesters containing small amounts of antimony or free of antimony are desired.

Known examples of compounds other than antimony-based compounds that can function as polycondensation catalysts are germanium-based compounds. However, germanium-based compounds are quite expensive and thus not suitable for common usage.

Other than antimony-based compounds and germanium-based compounds, titanium-based compounds are known.

For example, Japanese Unexamined Patent Application Publication No. 2002-187942 discloses a method of processing a titanium compound with water containing an alkaline compound, an organic solvent, or a mixture thereof before adding the titanium compound to the reaction system in the polyester polymerization step.

Japanese Unexamined Patent Application Publication No. 2000-119383 discloses a polyester polymerization catalyst composed of titanium dioxide having an average primary particle diameter of 100 nm or less.

Japanese Unexamined Patent Application Publication No. 2000-17065 discloses a polyester composition composed of a high-purity dicarboxylic acid component and a titanium compound.

Japanese Unexamined Patent Application Publication No. 10-316749 discloses a method for producing a polyester resin in which a product prepared by heating a mixture of an organotitanium compound and an organotin compound is used as a catalyst.

Japanese Unexamined Patent Application Publication No. 63-278927 discloses a method for producing polyester using a particular amount of a manganese compound, and an alkali metal compound, a phosphorus compound, or an organotitanium compound.

Japanese Unexamined Patent Application Publication No. 54-43294 discloses a method for producing a polyester from a zinc compound, a cobalt compound, an aromatic multivalent carboxylic acid, and tetraalkyl titanate.

Japanese Unexamined Patent Application Publication No. 54-37196 discloses a method for producing polyester, including performing transesterification between a particular amount of a manganese compound and a cobalt compound and then performing polymerization in the presence of a catalyst, which is a reaction product between an aromatic multivalent carboxylic acid and tetraalkyl titanate.

Japanese Unexamined Patent Application Publication No. 51-81896 discloses a method of combining a tellurium compound, a cobalt compound, and a cobalt salt of a phosphorus compound in the presence of a titanium oxide acting as a catalyst.

Japanese Unexamined Patent Application Publication No. 51-81895 discloses a method of combining a bismuth compound, a cobalt compound, and a cobalt salt of a phosphorus compound in the presence of a titanium oxide acting as a catalyst.

Japanese Unexamined Patent Application Publication No. 51-66395 discloses a method of adding a nickel compound in the presence of a titanium oxide acting as a catalyst.

Japanese Unexamined Patent Application Publication No. 7-292087 discloses a polyester in which the content of the metal precipitated particles derived from a titanium catalyst is controlled to a particular value or lower.

However, these techniques cannot prevent titanium compounds (polyester polymerization catalyst) from forming debris by deterioration or agglomeration during polyester polymerization reaction. Although it is possible to reduce debris, these techniques cannot prevent formation of coarse particles. For example, these techniques do not achieve sufficient effects as films for magnetic recording media applications that require particularly smooth and flat surfaces.

Films for magnetic recording media or the like commonly contain particles for enhancing the film slidability and film surface properties. For example, Japanese Unexamined Patent Application Publication No. 59-217755 discloses that the use of organic polymer particles highly compatible with polyesters is preferable. However, this technique is not sufficient for reducing coarse projections in film surfaces.

When titanium-based compounds are used as polycondensation catalysts, yellow polyesters are obtained as a result. Moreover, thermal stability of the polymer melted by heating is decreased, and film ruptures and the like occur, thereby decreasing productivity.

In order to overcome the problem of yellow coloration, cobalt compounds are commonly added to polyesters to reduce yellowness; however, cobalt compounds decrease thermal stability of the polyesters. Accordingly, the thermal stability of the melted polymer is further decreased, and the productivity is also decreased.

In order to overcome the problem of heat resistance and color tone associated with titanium-based catalysts, International Publication No. 95/18839 pamphlet discloses a method that uses a complex oxide of titanium and silicon as a catalyst.

Japanese Unexamined Patent Application Publication No. 2001-89557 discloses a titanium-compound catalyst synthesized by hydrolyzing a titanium halide.

However, these techniques do not improve hue as much as to be sufficient for films for optical applications, for example, where even minute differences in hue should be avoided. Moreover, the dispersibility of the hue-adjusting agent is low, thereby leading to problems such as scattering and generation of debris.

The present invention aims to provide a practical polyester that can be prepared substantially without using an antimony-based compound as a polycondensation catalyst.

DISCLOSURE OF INVENTION

The features of the present invention are as follows:

[1] A polyester resin composition comprising, on a weight basis, 30 ppm or less of antimony, 0.5 to 50 ppm of titanium, and 0.1 to 100 ppm of phosphorus, wherein the number density of titanium-containing particles, the equivalent circular diameter of which is 1 μm or more, is less than 100/0.02 mg.

[2] The polyester resin composition according to [1] above, wherein a titanium compound is used as a polymerization catalyst.

[3] The polyester resin composition according to [1] or [2] above, comprising a titanium oxide.

[4] The polyester resin composition according to [3] above, comprising a complex oxide of titanium and silicon.

[5] The polyester resin composition according to one of [1] to [4] above, comprising a titanium compound having at least one substituent selected from the group consisting of an alkoxy group, a phenoxy group, an acylate group, an amino group, and a hydroxyl group.

[6] The polyester resin composition according to [5] above, wherein the alkoxy group in the titanium compound is at least one functional group selected from the group consisting of a β-diketone-system functional group, a hydroxycarboxylic acid-system functional group, and a ketoester-system functional group.

[7] The polyester resin composition according to [5] above, wherein the acylate group in the titanium compound is either a multivalent carboxylic acid-system functional group or a nitrogen-containing multivalent carboxylic acid-system functional group.

[8] The polyether resin composition according to [5] above, wherein the titanium compound has an aliphatic alkoxy group or an aliphatic acylate group.

[9] The polyether resin composition according to one of [1] to [8] above, comprising at least one phosphorus-based compound selected from the group consisting of a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, and a phosphine-based compound.

[10] The polyester resin composition according to [9] above, comprising phosphoric acid and/or a phosphate compound.

[11] The polyester resin composition according to [9] above, comprising a phosphonic acid compound and/or a phosphonate compound.

[12] The polyester resin composition according to [11] above, wherein the phosphorus-based compound is ethyl diethylphosphonoacetate.

[13] The polyester resin composition according to one of [1] to [12] above, wherein the molar ratio of titanium to phosphorus (Ti/P) is in the range of 0.1 to 20.

[14] The polyester resin composition according to [1] to [13] above, further comprising 5 to 100 ppm of an alkaline earth metal element on a weight basis.

[15] The polyester resin composition according to [14], comprising 15 to 60 ppm of magnesium on a weight basis.

[16] The polyester resin composition according to one of [1] to [15] above, wherein the specific volume resistivity is in the range of $1\times10^6$ to $1\times10^9$ Ω·cm when melted.

[17] A polyester film comprising the polyester resin composition according to one of [1] to [16] above.

[18] A laminated polyester film comprising a plurality of layers at least one of which comprises the polyester resin composition according to one of [1] to [16] above.

[19] A magnetic recording medium, comprising the laminated polyester film according to [18].

([1] to [19] are referred to as Invention Group I)

[20] A polyester resin composition comprising, on a weight basis, 30 ppm or less of antimony, 0.5 to 50 ppm of titanium, and 0.1 to 100 ppm of phosphorus, wherein organic polymer particles are contained in amount of 0.1 to 5 wt %, the organic polymer particles having an average particle diameter determined by dynamic light scattering of 0.05 to 3 μm and containing 0.01% or less of coarse particles relative to the total number of the particles, the coarse particles having a diameter at least twice the average particle diameter.

[21] The polyester resin composition according to [20] above, wherein a titanium compound is used as a polymerization catalyst.

[22] The polyester resin composition according to [20] or [21] above, comprising a titanium oxide.

[23] The polyester resin composition according to [22] above, comprising a complex oxide of titanium and silicon.

[24] The polyester resin composition according to one of [20] to [23] above, comprising a titanium compound having at least one substituent selected from the group consisting of functional groups represented by formulae 1 to 6 below:

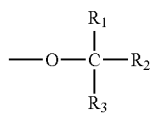

(Formula 1)

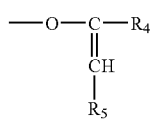

(Formula 2)

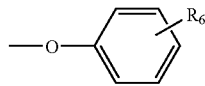

(Formula 3)

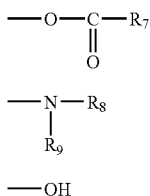

(wherein $R_1$ to $R_9$ each represent hydrogen or a $C_1$-$C_{30}$ hydrocarbon group).

[25] The polyester resin composition according to [24] above, wherein at least one of $R_1$ to $R_9$ in formulae 1 to 6 is a $C_1$-$C_{30}$ hydrocarbon group having an alkoxy group, a hydroxyl group, a carbonyl group, an acetyl group, a carboxyl group, an ester group, or an amino group.

[26] The polyester resin composition according to [25] above, wherein at least one of $R_1$ to $R_6$ in formulae 1 to 3 is a $C_1$-$C_{30}$ hydrocarbon group having a hydroxyl group, a carbonyl group, an acetyl group, a carboxyl group, or an ester group.

[27] The polyester resin composition according to [25] above, wherein at least one of $R_1$ to $R_3$ in formula 1 is a $C_1$-$C_{30}$ hydrocarbon group having a carboxyl group or an ester group.

[28] The polyester resin composition according to [25], wherein $R_7$ in formula 4 is a $C_1$-$C_{30}$ hydrocarbon group.

[29] The polyester resin composition according to [28], wherein $R_7$ in formula 4 represents a $C_1$-$C_{30}$ hydrocarbon group having a hydroxyl group, a carbonyl group, an acetyl group, a carboxyl group, or an ester group.

[30] The polyester resin composition according to one of [20] to [29] above, comprising at least one phosphorus-based compound selected from the group consisting of a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, and a phosphine-based compound.

[31] The polyester resin composition according to [30] above, comprising phosphoric acid and/or a phosphate compound.

[32] The polyester resin composition according to [30] above, comprising a phosphonic acid compound and/or a phosphonate compound.

[33] The polyester resin composition according to [32] above, wherein the phosphorus-based compound is ethyl diethylphosphonoacetate.

[34] The polyester resin composition according to one of [20] to [33] above, wherein the molar ratio of titanium to phosphorus (Ti/P) is in the range of 0.1 to 20.

[35] The polyester resin composition according to one of [20] to [34] above, further comprising 5 to 100 ppm of an alkaline earth metal element on a weight basis.

[36] The polyester resin composition according to [35] above, comprising 15 to 60 ppm of magnesium on a weight basis.

[37] The polyester resin composition according to one of [20] to [36] above, wherein the organic polymer particles have a degree of cross-linking of at least 50%.

[38] The polyester resin composition according to one of [20] to [37] above, wherein the organic polymer particles are a vinylbenzene-divinylbenzene copolymer.

[39] The polyester resin composition according to one of [20] to [38] above, wherein 0.1 to 5 wt % of a water-soluble polymer relative to the organic polymer particles is contained.

[40] The polyester resin composition according to [39], wherein the water-soluble polymer has a pyrrolidone residue.

[41] The polyester resin composition according to one of [20] to [40] above, wherein the specific volume resistivity is in the range of $1\times10^6$ to $1\times10^9$ $\Omega\cdot$cm when melted.

[42] A polyester film comprising the polyester resin composition according to one of [20] to [41] above.

[43] A laminated polyester film comprising a plurality of layers at least one of which comprises the polyester resin composition according to one of [20] to [41].

[44] A magnetic recording medium, comprising the laminated polyester film according to [43].

([20] to [44] are referred to as Invention Group II)

[45] A catalyst for producing polyesters, comprising a reaction product between at least one compound selected from the group consisting of the compounds represented by general formulae 7 and 8 below and a ligand comprising at least one type of atom selected from the group consisting of a nitrogen atom, a sulfur atom, and an oxygen atom as the donor atom, and being capable of coordinating with two or more sites:

 (Formula 7)

 (Formula 8)

(wherein Rs may be the same or different and each represent $C_2$-$C_{10}$ organic group, and m represents an integer of 1 to 4).

[46] The catalyst for producing polyesters according to above, wherein the organic group R is an alkyl group.

[47] The catalyst for producing polyesters according to [45] or [46] above, wherein the compound represented by general formula 7 or 8 is a tetraalkoxytitanium compound or a titanium chelate compound.

[48] The catalyst for producing polyesters according to one of [45] to [47] above, wherein the ligand is at least one compound selected from the group consisting of metal-free phthalocyanine, indanthrone, anthraquinone, and methine.

[49] A polyester resin composition produced in the presence of the catalyst for producing polyesters according to one of [45] or [48] above.

[50] A polyester film comprising the polyester resin composition according to [49].

[51] A laminated polyester film comprising a plurality of layers, at least one of which comprises the polyester resin composition according to [49] above.

[52] A magnetic recording medium, comprising the laminated polyester film according to [51] above.

([45] to [52] are Referred to as Invention Group III)

Invention Groups I to III can provide a polyester having excellent slidability and thermal stability and suitable for practical applications including magnetic recording medium applications by using substantially no antimony-based compound as a polycondensation catalyst.

(Invention Group III)

Invention Group III can provide a polyester that has satisfactory hue.

BEST MODE FOR CARRYING OUT THE INVENTION (Invention Groups I to III)

Polyesters are polymers synthesized from dicarboxylic acid or its ester-forming derivative and diol or its ester-forming derivative.

Examples of the dicarboxylic acid include aromatic dicarboxylic acids such as terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid, 4,4'-diphenylsulfondicarboxylic acid, and 5-sodium sulfoisophthalic acid; aliphatic dicarboxylic acids, such as dimer acid, adipic acid, and sebacic acid; and alicyclic dicarboxylic acids such as cyclohexanedicarboxylic acid. The ester-forming derivatives thereof may also be used.

Examples of the diol include aliphatic, alicyclic, and aromatic diols, such as ethylene glycol, 1,3-propanediol, 1,2-propanediol, neopentyl glycol, 1,3-buanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2-bis(4'-β-hydroxyethoxyphenyl)propane, and ethylene oxide adducts of bisphenol A.

These components may be used alone or in combination.

In addition, hydroxycarboxylic acid, such as parahydroxybenzoic acid, and its ester-forming derivative may be used.

Examples of polyesters include, polyethylene terephthalate, polybutylene terephthalate, polycyclohexanedimethylene terephthalate, polytrimethylene terephthalate (a.k.a., polypropylene terephthalate), polyethylene naphthalate, and polyethylene-1,2-bis(2-chlorophenoxy)ethane-4,4'-dicarboxylate. Among these, polyethylene terephthalate or a polyester copolymer containing ethylene terephthalate units as the main units are preferable due to their versatility. The comonomers for the copolymer may be adequately selected from the dicarboxylic acids and diols mentioned above.

In the present invention, a "catalyst" refers to a substance that substantially contributes to promoting all of the reactions (1) to (3) below or some of their elementary reactions:

(1) esterification reaction between a dicarboxylic acid component and a diol component;
(2) transesterification reaction between an ester-forming derivative of a dicarboxylic acid and a diol component; and
(3) polycondensation reaction for increasing the degree of polymerization of low-grade polyethylene terephthalate produced by the esterification reaction or the transesterification reaction after the reaction is substantially terminated.

It should be noted here that titanium oxide particles commonly used as inorganic particles for in fiber delustering agents and the like have substantially no catalytic effect to the reactions mentioned above. Thus, they are different from the titanium compound described below, which functions as a catalyst in the present invention.

(Invention Groups I and II)

It is important that the polyester resin compositions of the Invention Groups I and II contain 30 ppm or less of antimony on a weight basis. In this manner, contamination of dies during molding, filter clogging, and generation of debris can be reduced, and polymers can be produced at low costs. The antimony content is more preferably 10 ppm or less and most preferably substantially zero.

It is important that the polyester resin compositions of the Invention Groups I and II contain titanium. Titanium is derived from a titanium compound used as a polymerization catalyst. In other words, the polyester resin composition of the Invention Groups I and II are preferably prepared in the presence of a titanium compound acting as a polymerization catalyst.

It is important that the titanium content in the resin composition, i.e., the amount of the titanium compound used as the polymerization catalyst in terms of titanium, be in the range of 0.5 to 50 ppm, preferably 1 to 30 ppm, and most preferably 3 to 20 ppm, on a weight basis. Within these ranges, polymerization activity is high, and thermal stability and hue of the resulting polymer are satisfactory. At a titanium content of less than 0.5 ppm, the polymerization activity is not sufficient. At a titanium content exceeding 50 ppm, debris derived from the titanium catalyst is easily produced, and the resulting polyester exhibits low heat resistance.

A preferred example of the titanium compound is a titanium oxide. In particular, a complex oxide of titanium and silicon and ultra fine particles of titanium oxide are preferable from the standpoints of polymerization activity and reduced formation of debris. The complex oxide of titanium and silicon may contain other metal elements.

The titanium oxide may be obtained by, for example, hydrolyzing an alkoxide compound of titanium.

The complex oxide may be synthesized by, for example, a coprecipitation method, a partial hydrolysis method, or a coordination chemistry sol-gel method from a main starting material, i.e., a titanium alkoxide compound, in the presence of small amounts of alkoxide compounds of other metals, such as silicon and zirconium, or a polyhydric alcohol compound. Here, the coprecipitation method refers to a method in which a solution containing two or more components and having a predetermined composition is prepared, and this solution is hydrolyzed while maintaining this composition. The partial hydrolysis method refers to a method in which one component is hydrolyzed in advance, and to this component, the other component is added to further conduct hydrolysis. The coordination chemistry sol-gel method refers to a method in which a titanium alkoxide row material is preliminarily reacted with a polyhydric alcohol compound or the like having a plurality of functional groups in a molecule to control the speed of the subsequent hydrolysis reaction by the reaction product. These methods for synthesizing compounds are disclosed in, for example, Ueno et al., "Kinzoku arukokishido wo mochiiru shokubai chousei (Catalyst Preparation with Metal Alkoxide)", p. 321, line 1 to p. 353, line 16, IPC, Aug. 10, 1993.

The molecular weight of the titanium oxide super fine particles usable as a polymerization catalyst is preferably lower than 100,000 g/mol from the standpoint of catalytic activity and prevention of debris. The molecular weight of the titanium oxide super fine particles is more preferably 500 to 100,000 g/mol, yet more preferably 1,000 to 50,000 g/mol, and most preferably 1,500 to 20,000 g/mol.

Titanium oxides having at least one substituent selected from the group consisting of an alkoxy group, a phenoxy group, an acylate group, an amino group, and a hydroxyl group are also preferable as the polymerization catalyst.

Examples of the alkoxy group include tetraalkoxy groups such as tetraethoxide, tetrapropoxide, tetraisopropoxide, tetrabutoxide, and tetra-2-ethylhexoxide. Examples of alkoxy groups in a broader sense, i.e., alkoxy groups having the organic group bonded to a titanium atom via an oxygen atom, include β-diketone-system functional groups such as acetylacetone; multivalent hydroxycarboxylic acid-system groups such as lactic acid, malic acid, tartaric acid, salicylic acid, and citric acid; and ketoester-system functional groups such as methyl acetoacetate and ethyl acetoacetate. Aliphatic alkoxy groups are particularly preferable from the standpoint of suppressing the formation of debris.

Examples of the phenoxy groups include phenoxy and cresylate.

Examples of the acylate groups include tetraacylates such as lactate and stearate; multivalent carboxylic acid-system groups such as phthalic acid, trimellitic acid, trimesic acid, hemimellitic acid, pyromellitic acid, oxalic acid, malonic acid, succinic acid, glutaric acid, adipic acid, sebacic acid, maleic acid, fumaric acid, cyclohexanedicarboxylic acid, and anhydrides thereof; nitrogen-containing multivalent carboxylic acid-system functional groups such as ethylenediaminetetraacetic acid, nitrilotripropionic acid, carboxyiminodiacetic acid, carboxymethyliminodipropionic acid, diethylenetriaminopentaacetic acid, triethylenetetraamine hexaacetic acid, iminodiacetic acid, iminodipropionic acid, hydroxyethyliminodiacetic acid, hydroxyethyliminodipropionic acid, and methoxyethyliminodiacetic acid. Aliphatic acylate groups are particularly preferred from the standpoint of preventing formation of debris.

Examples of the amino groups include aniline, phenylamine, and diphenylamine.

Di-isopropoxy bis-acetylacetone, triethanolaminate isopropoxide, or the like containing two of these functional groups may be used.

Among these titanium compounds, tetraalkoxytitanium compounds and titanium acylate compounds are preferable from the standpoint of preventing formation of debris.

Titanium compounds having at least one substituent selected from the functional groups represented by formulae 1 to 6 below are preferable from the standpoint of preventing formation of debris:

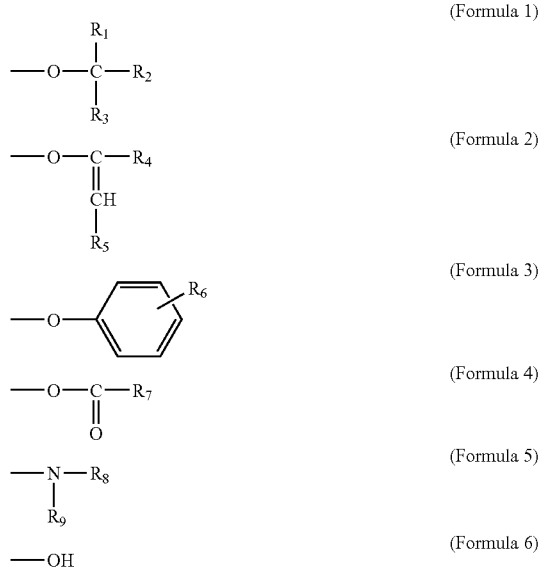

wherein $R_1$ to $R_9$ in formulae 1 to 6 each represent a hydrogen or a $C_1$-$C_{30}$ hydrocarbon group.

Preferably, at least one of $R_1$ to $R_9$ in formulae 1 to 6 is a $C_1$-$C_{30}$ hydrocarbon group having an alkoxy group, a hydroxyl group, a carbonyl group, an acetyl group, a carboxyl group, an ester group, or an amino group.

Preferably, at least one of $R_1$ to $R_6$ in formulae 1 to 3 is a $C_1$-$C_{30}$ hydrocarbon group having a hydroxyl group, a carbonyl group, an acetyl group, a carboxyl group, or an ester group.

Preferably, at least one of $R_1$ to $R_3$ in formula 1 is a $C_1$-$C_{30}$ hydrocarbon group having a carboxyl group or an ester group.

Preferably, $R_7$ in formula 4 is a $C_1$-$C_{30}$ hydrocarbon group.

Preferably, $R_7$ in formula 4 represents a $C_1$-$C_{30}$ hydrocarbon group having a hydroxyl group, a carbonyl group, an acetyl group, a carboxyl group, or an ester group.

Examples of the functional group represented by formula 1 include alkoxy groups such as ethoxide, propoxide, isopropoxide, butoxide, and 2-ethylhexoxide, and multivalent hydroxycarboxylic acid-system compounds such as lactic acid, malic acid, tartaric acid, and citric acid.

Examples of the functional group represented by formula 2 include β-diketone-system compounds such as acetylacetone and ketoester-system compounds such as methyl acetoacetate and ethyl acetoacetate.

Examples of the functional group represented by formula 3 include phenoxy, cresylate, and salicylic acid.

Examples of the functional group represented by formula 4 include acylate groups such as lactate and stearate; multivalent carboxylic acids such as phthalic acid, trimellitic acid, trimesic acid, hemimellitic acid, pyromellitic acid, oxalic acid, malonic acid, succinic acid, glutaric acid, adipic acid, sebacic acid, maleic acid, fumaric acid, cyclohexanedicarboxylic acid, and anhydrides thereof; and nitrogen-containing multivalent carboxylic acids such as ethylenediaminetetraacetic acid, nitrilotripropionic acid, carboxyiminodiacetic acid, carboxymethyliminodipropionic acid, diethylenetriaminopentaacetic acid, triethylenetetraamine hexaacetic acid, iminodiacetic acid, iminodipropionic acid, hydroxyethyliminodiacetic acid, hydroxyethyliminodipropionic acid, and methoxyethyliminodiacetic acid.

Examples of the functional group represented by formula 5 include aniline, phenylamine, and diphenylamine.

Preferably, the substituent represented by formula 1 and/or formula 4 is contained from the standpoint of thermal stability and hue of the resulting polymer.

Examples of the titanium compound containing two or more or the substituents represented by formulae 1 to 6 include titanium di-isopropoxy bis-acetylacetonate and titanium triethanolaminate isopropoxide.

It is important that the polyester resin compositions of the Invention Groups I and II contain phosphorus. Production of polyesters uses phosphorus-based compounds as aids for controlling the catalytic activity and increasing the heat resistance of the resulting polymer. Phosphorus in the polyester resin compositions is derived from the phosphorus-based compounds used.

It is important that the phosphorus content in the resin composition, i.e., the amount of the phosphorus-based compound used in terms of phosphorus, be in the range of 0.1 to 100 ppm on a weight basis. At a content less than 0.1 ppm, formation of debris easily occurs due to the catalyst, and the hue and heat resistance of the resulting polyester are degraded. In contrast, at a content exceeding 100 ppm, formation of debris easily occurs due to the catalyst, and the polymerization reaction requires a longer time, thereby decreasing the productivity. The phosphorus content is preferably 1 to 80 ppm, more preferably 3 to 50 ppm, yet more preferably 3 to 35 ppm, and most preferably 3 to 20 ppm from the standpoint of thermal stability during yarn-making or film-making and hue of the polyester.

The phosphorus-based compound is preferably at least one selected from the group consisting of a phosphoric acid-based compound, a phosphorous acid-based compound, a phosphonic acid-based compound, a phosphinic acid-based compound, a phosphine oxide-based compound, a phosphonous acid-based compound, a phosphinous acid-based compound, and a phosphine-based compound from the standpoint of thermal stability, suppression of debris, and improving hue. Phosphoric acid-based and phosphonic acid-based compounds are particularly preferable from the same standpoint.

Examples of phosphoric acid-based compound include phosphoric acid and phosphate compounds such as trimethyl phosphate, triethyl phosphate, and triphenyl phosphate. Among the phosphoric acid-based compounds, phosphoric acid and phosphate compounds are preferable from the standpoint of thermal stability, suppression of debris, and improvement of hue. In other words, the polyester resin compositions of the Invention Groups I and II preferably contain phosphoric acid and/or a phosphate. In the present invention, the phrase "and/or" means either one of the two can be used alone or both may be used in combination.

Examples of the phosphorous acid-based compounds include phosphorous acid, trimethyl phosphite, triethyl phosphite, and triphenyl phosphite.

Among the phosphonic acid-based compounds, phosphonic acid compounds and phosphonate compounds are preferable from the standpoints of thermal stability, suppression of debris, and improvement of hue. In other words, the polyester resin compositions of the Invention Groups I and II preferably contain phosphonic acid compounds and/or phosphonate compounds.

Examples of the phosphonic acid compound include, methylphosphonic acid, ethylphosphonic acid, propylphosphonic acid, isopropylphosphonic acid, butylphosphoniracid, phenylphosphonic acid, benzylphosphonic acid, tolylphosphonic acid, xylylphosphonic acid, biphenylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, and 2,4,6-tricarboxyphenylphosphonic acid.

Examples of the phosphonate include dimethyl methylphosphonate, diethyl methylphosphonate, dimethyl ethylphosphonate, diethyl ethylphosphonate, dimethyl phenylphosphonate, diethyl phenylphosphonate, diphenyl phenylphosphonate, dimethyl benzylphosphonate, diethyl benzylphosphonate, diphenyl benzylphosphonate, lithium (ethyl 3,5-di-tert-butyl-4-hydroxybenzylphosphonate), sodium(ethyl 3,5-di-tert-butyl-4-hydroxybenzylphosphonate), magnesium bis(ethyl 3,5-di-tert-butyl-4-hydroxybenzylphosphonate), calcium bis(ethyl 3,5-di-tert-butyl-4-hydroxybenzylphosphonate), diethylphosphonoacetic acid, methyl diethylphosphonoacetate, and ethyl diethylphosphonoacetate. In particular, ethyl diethylphosphonoacetate is preferable from the standpoints of thermal stability, suppression of debris, and improvement of hue.

Examples of the phosphinic acid-based include hypophosphorous acid, sodium hypophosphite, methylphosphinic acid, ethylphosphinic acid, propylphosphinic acid, isopropylphosphinic acid, butylphosphinic acid, phenylphosphinic acid, tolylphosphinic acid, xylylphosphinic acid, biphenylphosphinic acid, diphenylphosphinic acid, dimethylphosphinic acid, diethylphosphinic acid, dipropylphosphinic acid, diisopropylphosphinic acid, dibutylphosphinic acid, ditolylphosphinic acid, dixylylphosphinic acid, dibiphenylphosphinic acid, naphthylphosphinic acid, anthrylphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl)phosphinic acid, bis(3-carboxyphenyl)phosphinic acid, bis(4-carboxyphenyl)phosphinic acid, bis(2,3-dicarboxyphenyl)phosphinic acid, bis(2,4-dicarboxyphenyl)phosphinic acid, bis(2,5-dicarboxyphenyl)phosphinic acid, bis(2,6-dicarboxyphenyl)phosphinic acid, bis(3,4-dicarboxyphenyl)phosphinic acid, bis(3,5-dicarboxyphenyl)phosphinic acid, bis(2,3,4-tricarboxyphenyl)phosphinic acid, bis(2,3,5-tricarboxyphenyl)phosphinic acid, bis(2,3,6-tricarboxyphenyl)phosphinic acid, bis(2,4,5-tricarboxyphenyl)phosphinic acid, bis(2,4,6-tricarboxyphenyl)phosphinic acid, methyl methylphosphinate, methyl dimethylphosphinate, ethyl methylphosphinate, ethyl dimethylphosphinate, methyl ethylphosphinate, methyl diethylphosphinate, ethyl ethylphosphinate, ethyl diethylphosphinate, methyl phenylphosphinate, ethyl phenylphosphinate, phenyl phenylphosphinate, methyl diphenylphosphinate, ethyl diphenylphosphinate, phenyl diphenylphosphinate, methyl benzylphosphinate, ethyl benzylphosphinate, phenyl benzylphosphinate, methyl bisbenzylphosphinate, ethyl bisbenzylphosphinate, and phenyl bisbenzylphosphinate.

Examples of the phosphine oxide system include trimethylphosphine oxide, triethylphosphine oxide, tripropylphosphine oxide, triisopropylphosphine oxide, tributylphosphine oxide, and triphenylphosphine oxide.

Examples of the phosphonous acid-based include methylphosphonous acid, ethylphosphonous acid, propyl phosphonous acid, isopropylphosphonous acid, butylphosphonous acid, and phenylphosphonous acid.

Examples of the phosphinous acid-based include methylphosphinous acid, ethylphosphinous acid, propylphosphinous acid, isopropylphosphinous acid, butylphosphinous acid, phenylphosphinous acid, dimethylphosphinous acid, diethylphosphinous acid, dipropylphosphinous acid, diisopropylphosphinous acid, dibutylphosphinous acid, and diphenylphosphinous acid.

Examples of the phosphine system include methylphosphine, dimethylphosphine, trimethylphosphine, ethylphosphine, diethylphosphine, triethylphosphine, phenylphosphine, diphenylphosphine, and triphenylphosphine.

These phosphorus-based compounds may be used alone or in combination.

When the molar ratio of titanium to phosphorus, Ti/P, is in the range of 0.1 to 20, the polyester exhibits satisfactory thermal stability and hue. More preferably, Ti/P is in the range of 0.2 to 10, and most preferably in the range of 0.3 to 5.

During the polymerization, an alkaline earth metal element is preferably incorporated from the standpoints of suppression of debris, polymerization activity, and specific volume resistivity of the melted polyester resins. The content of the alkaline earth metal element is preferably in the range of 5 to 100 ppm, more preferably in the range of 10 to 80 ppm, and most preferably in the range of 15 to 60 ppm on a weight basis. At a content of 100 ppm or less, formation of debris containing titanium can be suppressed.

Among alkaline earth metal elements, calcium and magnesium are preferable. In particular, magnesium is preferable from the standpoints of suppression of debris and specific volume resistivity of the melted polyester resin. Its chlorides and carboxylates are preferable as the additive compounds. In particular, magnesium acetate is preferable from the same standpoints.

The polyester resin compositions of the Invention Groups I and II preferably contain manganese. Manganese is derived from a manganese compound added to the polyester resin composition at a predetermined stage before the termination of the preparation of the polyester by polymerization.

The manganese content in the polyester resin composition, i.e., the amount of the manganese compound in terms of manganese, is preferably in the range of 1 to 400 ppm on a weight basis. The molar-ratio of manganese to phosphorus, i.e., Mn/P, is preferably in the range of 0.1 to 200. In this range, a decrease in polymerization activity can be suppressed, and the hue of the resulting polymer improves. Examples of the manganese compound include manganese chloride, manganese bromide, manganese nitrate, manganese carbonate, manganese acetylacetonate, manganese acetate tetrahydrate, and manganese acetate dihydrate.

Moreover, it is preferable to add a cobalt compound at a desired point during the process of preparing the polyester resin compositions of Invention Groups I and II, i.e., to prepare polyester resin compositions containing cobalt compounds. In this manner, the hue of the resulting polymer is improved. Examples of the cobalt compounds include cobalt chloride, cobalt nitrate, cobalt carbonate, cobalt acetylacetonate, cobalt naphthenate, and cobalt acetate tetrahydrate.

The polyester may incorporate an alkali metal compound, an aluminum compound, a zinc compound, a tin compound, or the like. In this manner, the hue and thermal resistance of the polyester can be improved.

(Invention Group I)

It is important that the number of titanium-containing particles, the equivalent circular diameter of which is 1 µm or more, of each polyester resin composition of Invention Group I is less than 100 for 0.02 mg of the composition. Here, "equivalent circular diameter" refers to a diameter of a circle having the same area as the projected image of a particle.

These titanium-containing particles are one form of debris mentioned above. When the number density of such particles is 100 or more, the surface roughness of the resulting film may increase, and the transparency of the film may be degraded. The number density of the particles is preferably 80/0.02 mg or less, and more preferably 50/0.02 mg or less. In order to suppress formation of titanium-containing particles, i.e., formation of debris, it is preferable to suppress hydrolysis of the titanium compound, i.e., the polymerization catalyst, during the polymerization reaction.

(Invention Group II)

It is important that the polyester resin composition of Invention Group II contain organic polymer particles. Compared to other particles that can impart satisfactory winding property and slidability to polyester films, organic polymer particles have higher compatibility to polyesters and relatively uniform particle shape.

The organic polymer particles preferably have an average particle diameter determined by dynamic light scattering of 0.05 to 3 µm, more preferably 0.11 to 2 µm, and most preferably 0.3 to 1 µm. At an average particle diameter exceeding 3 µm, filter clogging easily occurs during filtration. At a diameter less than 0.05 µm, satisfactory winding property cannot be imparted to the polyester formed into films.

The ratio of the number of coarse particles relative to the total number of the particles, the coarse particles having a diameter at least twice the average particle diameter, must be 0.01% or lower, preferably 0.005% or lower, and most preferably 0.001% or loser. When the ratio of the coarse particles exceeds 0.01%, the number of coarse projections found in the surface increases, and missing record or the like may occur when the film is processed into magnetic recording media.

The content of the organic polymer particles must be 0.1 to 5 wt % of the polyester resin composition. The content is more preferably 0.5 to 3 wt %, and most preferably 1 to 2 wt %. At a particle content of less than 0.1 wt %, the slidability of the resulting film will be insufficient. At a particle content exceeding 5 wt %, the roughness of the film surface becomes excessively high, thereby decreasing flatness.

Examples of the raw materials for the organic polymer particles include crosslinked polystyrene, silicone, a melamine-formaldehyde copolymer, benzoguanamine, thermosetting epoxy, and crosslinked polyesters. Among these, crosslinked polystyrene is preferable. In particular, a vinylbenzene-divinylbenzene copolymer is preferable from the standpoints of heat resistance and the polyester compatibility of the particles.

The degree of cross-linking of the organic polymer particles is preferably at least 50%, preferably at least 65%, and most preferably at least 80% from the standpoints of heat resistance. Here, the "degree of cross-linking" of the organic particles refers to a ratio of the weight of the crosslinkable monomer fed to the total weight of the monomers. The crosslinkable monomer is preferably a compound having at least two, and more preferably, exactly two copolymerizable double bonds. Examples thereof include nonconjugated divinyl compounds such as divinylbenzene or multivalent acrylate compounds such as trimethylolpropane trimethacrylate and trimethylolpropane triacrylate.

The organic polymer particles are preferably globular and in particular, spherical in shape since such particles effectively impart slidability to the film. The particles may be composite particles (core/shell type), hollow particles, or the like. The particles may be surface-treated by silane coupling, titanate coupling, or the like.

The polyester resin composition of the Invention Group II preferably contains a water-soluble polymer to increase the dispersibility for organic polymer particles.

The content of the water-soluble polymer is preferably in the range of 0.1 to 5 wt % relative to the organic polymer particles. The content is more preferably 0.4 to 3 wt %, and most preferably 0.8 to 2 wt %. At a content 0.1 wt % or more, the dispersibility for the organic polymer particles can be improved, and at a content of 5 wt % or less, the polymer is prevented from producing coarse projections in the film surface.

Examples of the water-soluble polymer include polyvinylpyrrolidone, polyvinyl alcohol, and carboxylmethylcellulose. In particular, a compound having a pyrrolidone residue, such as polyvinylpyrrolidone, is preferable from the standpoint of increasing the dispersibility for the organic polymer particles.

The water-soluble polymer is preferably combined with an organic polymer particle slurry and subjected to surface treatment in advance, and then melt-mixed with the polyester to yield satisfactory dispersibility.

(Invention Group III)

The catalyst for producing polyesters according to Invention Group III contains a reaction product between at least one compound (hereinafter also referred to as "compound α) selected from the group consisting of the compounds represented by general formulae 7 and 8 below and a ligand compound containing at least one type of atom selected from the group consisting of a nitrogen atom, a sulfur atom, and an oxygen atom as the donor atom and being capable of coordinating with two or more sites and is hereinafter also referred to as "compound β":

$$Ti(OR)_4 \quad \text{(Formula 7)}$$

$$Ti(OH)_m(OR)_{4-m} \quad \text{(Formula 8)}$$

wherein Rs may be the same or different and each represent $C_2$-$C_{10}$ organic group, m represents an integer of 1 to 4. R is preferably an alkyl group.

For the catalyst for producing polyesters according to Invention Group III, it is important that the compound α and the compound β form a reaction product in which the compound β is a ligand.

The compound α has activity for polycondensation reaction and functions as a polymerization catalyst. The compound β improves the hue of the resulting polyester. By using the reaction product between the compounds α and β as a catalyst, a polyester having excellent hue and heat resistance can be efficiently produced. Here, the ligand compound β is coordinated with the compound α to form a reaction product. This is clearly distinct from directly adding the ligand compound β to the polyester to improve the hue. By using the reaction product, problems that associated with direct addition of the ligand compound β to the polyester, i.e., poor dispersibility and scattering to outside the system, can be overcome, and the productivity can be increased.

The compound α is preferably a tetraalkoxytitanium compound or a titanium chelate compound.

Examples of the tetraalkoxytitanium compound include tetraisopropyl titanate, tetrabutyl titanate, and tetra(2-ethylhexyl)titanate, and tetramethyl titanate. Among these, tetrabutyl titanate is particularly preferable.

Examples of the titanium chelate compound include titanium acetylacetonate, titanium tetraacetylacetonate, titanium octyleneglycolate, titanium lactate, titanium ethylacetoacetate, titanium citrate, and titanium ammonium titaniumperoxocitrate. Among these, titanium acetylacetonate, titanium citrate, and titanium ammonium titaniumperoxocitrate having good reactivity to the ligand compound β are preferable.

The ligand compound β is preferably at least one compound selected from the group consisting of indanthrone, anthraquinone, methine, and metal-free phthalocyanine. An example of indanthrone is one having the structure represented by A; examples of anthraquinone include those having structures represented by B, C, D, E, and F; an example of methine is one having the structure represented by G; and an example of metal-free phthalocyanine is one having the structure represented by H:

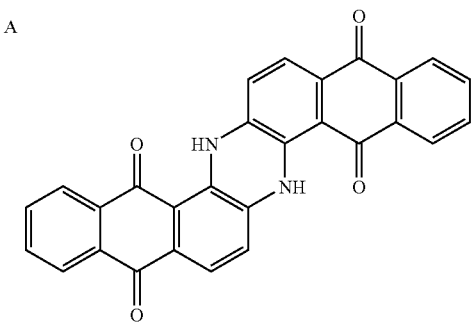

A

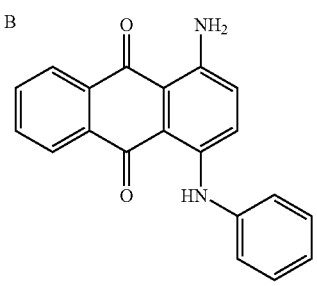

B

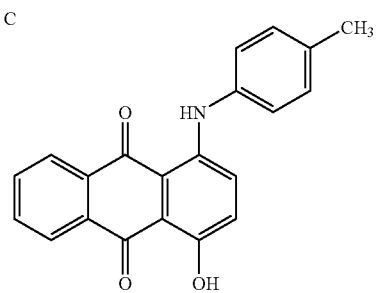

C

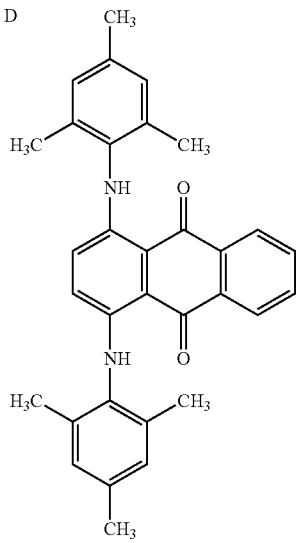

D

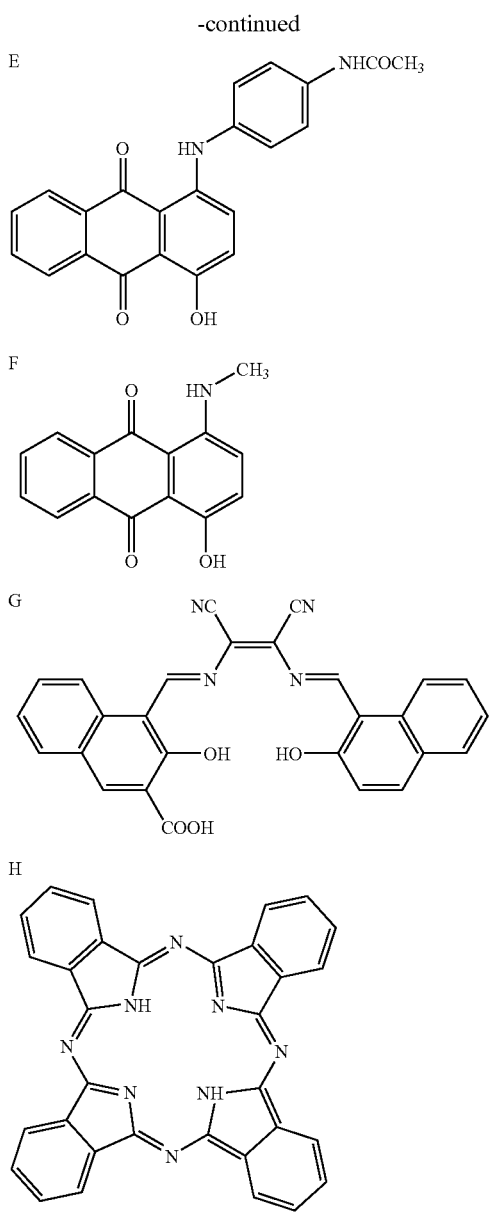

The molar ratio of the ligand compound β to the compound α in the reaction product preferably satisfies 0.001≦(moles of β/moles of α)≦1. At a ratio of 0.001 or more, the ligand compound β sufficiently increases dispersibility and prevents scattering to outside the system. Moreover, the hue can be improved as a result of the coordination. By adjusting the ratio to 1 or less, polymer is prevented from having excessive blue tinge.

The reaction product between the compound α and the ligand compound β can be prepared by, for example, dissolving the ligand compound β in a solvent, adding the compound α to the resulting solution, and heating the reaction system at 0° C. to 200° C. for 10 minutes or more, more preferably at normal temperature to 150° C., and most preferably at 40° C. to 150° C. for 30 minutes to 2 hours. Alternatively, the mixture of the compound α and the compound β may be added to the polyester polymerization system without heating.

Examples of the solvent include ethylene glycol, propylene glycol, tetramethylene glycol, and acetic acid. Solvents having high compatibility to the raw materials for polyesters are preferable.

The reaction product between the compound α and the ligand compound β may be isolated using an evaporator, a centrifugal separator, a filter, or the like, followed by recrystallization and refining. The refined product may be used as the catalyst.

The polyester resin composition of the Invention Group III is produced in the presence of the catalyst for producing polyesters according to the Invention Group III.

The amount of the catalyst for producing polyesters relative to the polyester resin composition according to the Invention Group III is preferably 1 to 30 ppm in terms of titanium on a weight basis. By adjusting the amount to 1 ppm or more, sufficient catalytic activity can be yielded. By adjusting to 30 ppm or less, the polymer can maintain satisfactory hue and heat resistance; moreover, formation of debris by the catalyst can be suppressed.

Various catalysts may be used for esterification or transesterification reaction. For example, acetates such as calcium acetate, magnesium acetate, and lithium acetate may be used.

It is also preferable to add a phosphorus compound, i.e., a hue adjustor, to the polyester resin composition of the Invention Group III.

Examples of the phosphorus compound include phosphoric acid systems, such as phosphoric acid, monomethylphosphoric acid, monoethylphosphoric acid, and trimethylphosphoric acid; phosphorous acid systems, such as phosphorous acid, dimethyl phosphite, and trimethyl phosphite; phosphonic acid systems, such as phenylphosphonic acid, dimethylphenyl phosphonate, dimethylbenzyl phosphonate, dimethylmethyl phosphonate, dipropylmethyl phosphonate, and ethyl diethylphosphonoacetate; and phosphinic acid systems such as diphenylphosphinic acid.

The amount of the phosphorus compound added relative to the polyester resin composition is preferably 1 to 50 ppm and more preferably 5 to 20 ppm in terms of phosphorus on a weight basis. By adjusting the amount to 1 ppm or more and preferably 5 ppm or more, change in color due to titanium can be suppressed. By adjusting the amount to 20 ppm or less, the polymerization activity of the catalyst for producing polyesters of the Invention Group III can be maintained.

The polyester resin composition of Invention Group III preferably contains an alkaline earth metal compound. The amount of the alkaline earth metal compound added relative to the polyester resin composition is preferably 0 to 80 ppm and more preferably 1 to 60 ppm in terms of total of the alkaline earth metal elements on a weight basis. Within these ranges, the productivity of the polyester resin composition is high and heat resistance can be maintained.

(Invention Groups I to III)

The polyester resin compositions of the Invention Groups I to III may contain, for example, pigments such as titanium oxide, silicon oxide, calcium carbonate, silicon nitride, clay, talc, kaolin, carbon black and the like; color protection agents; antioxidants, antistatic agents, nucleating agents, inorganic particles, organic particles, viscosity reducers, heat stabilizers, lubricants, infrared absorbers, and UV absorbers.

The specific volume resistivity of the polyester resin compositions of Invention Groups I to III when melted is preferably $1 \times 10^6$ to $1 \times 10^9$ Ω·cm, and more preferably $1 \times 10^7$ to $5 \times 10^8$ Ω·cm. In this manner, closely contact between the film and the casting drum can be increased by electro-pinning, thereby preventing air from entering the gap therebetween.

As a result, a film having excellent surface flatness and thickness uniformity can be formed, and film-making rate can be increased. The specific volume resistivity of the melt can be controlled by adjusting the amount of the alkaline earth metal element and phosphorus relative to the polyester resin. For example, increasing the alkaline earth metal element and decreasing phosphorus tend to decrease the specific volume resistivity. In contrast, decreasing the alkaline earth metal element and increasing phosphorus tend to increase the specific volume resistivity.

In general, polyethylene terephthalate, i.e., an example of polyesters, is produced by one of the following processes:

(1) conducting direct esterification using terephthalic acid and ethylene glycol as raw materials to obtain a lower polymer and then conducting polycondensation to obtain a high polymer; and (2) conducting transesterification using dimethyl terephthalate and ethylene glycol as raw materials to obtain a lower polymer and then conducting polycondensation to obtain a high polymer.

These reactions can be performed by a polymerization method such as a batch process, a semibatch process, or a continuous process.

The esterification in the process (1) above proceeds without any catalyst; however, the above-described titanium compound may be used as a catalyst. In such a case, the titanium compound may be fed to the reaction system immediately after the raw materials are fed or simultaneously with the raw materials.

The transesterification of the process (2) above may proceed in the presence of a catalyst, which may be any of manganese, calcium, magnesium, zinc, and lithium compounds and the titanium compounds described above.

If a catalyst is used in any of these reactions, a phosphorus compound, which inactivates the reaction catalyst, is added after the reaction is substantially terminated.

For the Invention Group II, at any desired stage in the process (1) or (2), organic polymer particles or various additives are fed to the system, and then a titanium compound, i.e., a polycondensation catalyst, is added to conduct polycondensation to prepare a high molecular-weight polyethylene terephthalate. Preferably, organic polymer particles and various additives are fed to the system after a lower polymer is obtained by esterification in the process (1) or by transesterification in the process (2).

In the esterification step, it is preferable to add small amounts of basic compounds to obtain a polyester resin composition containing smaller amounts of side reaction products. Examples of the basic compounds include tertiary amines such as triethylamine, tributylamine, and benzylmethylamine; quaternary amines such as tetraethylammonium hydroxide, tetrabutylammonium hydroxide, and trimethylbenzylammonium hydroxide; and potassium hydroxide, sodium hydroxide, potassium acetate, and sodium acetate.

In the polycondensation step, a stabilizer may be added to prevent side-reaction such as pyrolysis of polyesters. Examples of the stabilizer include diethyl[[3,5-bis(1,1-dimethylethyl)-4-hydroxyphenyl]methyl]phosphonate, tetrakis{methylene-3-(dodecylthio)propionate}methane, tetrakis{methylene-(3,5-tert-butyl-4-hydroxyhydrocinnamate)}methane, tridecyl phosphate, tris(2,4-dibutylphenyl)phosphite, tetrakis{methylene-3-(31,51-di-tert-butyl-4'-hydroxyphenyl)propionate}methane, and bis(2,6-di-tert-butyl-4-methylphenyl)pentaerythritol-di-phosphite. These may be used alone or in combination.

The amount of the stabilizer is preferably 0.03 to 2 wt %, and more preferably 0.05 to 1.9 wt % relative to the resulting polyester resin composition. At an amount of 0.03 wt % or more, oxidation stability can be effectively increased. At an amount of 2 wt % or less, obstruction of polycondensation can be prevented.

(Invention Group III)

When the stabilizer is preliminary combined with the polyester preparation catalyst of the Invention Group III before it is added to the reaction system, the amount of the stabilizer added is preferably 0.003 to 1 wt %. In particular, diethyl[[3,5-bis(1,1-diemthylethyl)-4-hydroxyphenyl]methyl]phosphonate and bis(2,6-di-tert-butyl-4-methylphenyl)pentaerythritol-di-phosphite are suitable for combination with the polyester preparation catalyst of the Invention Group III. By adding the stabilizer in an amount in the range of 0.003 to 0.1 wt %, a polyester resin composition having satisfactory heat resistance, reduced debris, and desirable hue is obtained.

(Invention Groups I to III)

As is mentioned above, phosphorus compounds inactivate catalysts for esterification and transesterification and are thus supplied to the reaction system after termination of esterification or transesterification but before polycondensation to control the activity of titanium compounds functioning as catalysts. In such a case, in order to avoid deactivation of the catalyst resulting from the contact between the titanium compound and the phosphorus compound, a technique of supplying the titanium compound and the phosphorus compound to separate reactors, a technique of staggering the timing for supplying the titanium compound and the phosphorus compound to the same reactor by 1 to 15 minutes, or a technique of setting apart the positions at which these compounds are fed is preferably employed.

The titanium compound and the phosphorus compound used in the Invention Groups I to III may be directly added to the polyester reaction system. Alternatively, they may be preliminarily combined with a solvent containing a diol component, such as ethylene glycol or propylene glycol, of the polyester to prepare solution or slurry and then added to the reaction system after, if necessary, removal of low boiling point components, such as alcohol, used during synthesis of the titanium or phosphorus compound. As a result, debris formation in the polymer can be suppressed.

Alternatively, the titanium compound may be reacted with the phosphorus compound in advance and the product may be used as the catalyst. Examples of such a method include:

(1) A titanium compound is completely or partly dissolved in a solvent to prepare a mixture, and a phosphorus compound, is added directly or after dilution with a solvent to this mixture dropwise; and (2) When a complex in which a ligand is coordinated with a titanium compound is to be used, a titanium compound or a ligand compound, such as a hydroxycarboxylic acid-system compound or a multivalent carboxylic acid-system compound, is completely or partly dissolved in a solvent to prepare a mixture, and a ligand compound or a titanium compound that forms a complex with the compound is added dropwise to this mixture, either directly or after dilution with a solvent. Subsequently, a phosphorus compound is added dropwise to this mixture either directly or after dilution with a solvent.

The reaction conditions of the methods (1) and (2) above are preferably 0° C. to 200° C. for 1 minute or more and more preferably 20° C. to 100° C. for 2 to 100 minutes. The reaction pressure is not particularly limited but may be normal pressure. The solvent used in the reaction may be selected from those compounds that can partly or completely dissolve the titanium compound, the phosphorus compound, or a carbonyl-containing ligand compound. Preferably, the solvent is selected from water, methanol, ethanol, ethylene glycol, propanediol, butanediol, benzene, and xylene.

(Invention Group II)

Organic polymer particles according to the Invention Group II can be prepared by emulsion polymerization, soap-free emulsion polymerization, seed emulsion polymerization, suspension polymerization, dispersion polymerization, two-step expansion polymerization, or the like.

The organic polymer particles are preferably monodispersed in the polyester. The monodispersed polymer can be obtained by melt-mixing the organic polymer particles with a polymer. In particular, the organic polymer particles are blended with water and/or an organic compound having a boiling point of 200° C. or less to prepare a slurry, the slurry is added to a polyester, and the resulting mixture is melt-kneaded in a vent-type molding machine while removing water and/or the organic compound having a boiling point of 200° C. or less contained in the slurry.

Examples of the organic compound having a boiling point of 200° C. or less include alcohols such as methanol, ethanol, and ethylene glycol; hydrocarbons such as benzene and toluene; esters; ketones; and amines. From the standpoints of ease of handling and removal, water is preferably used as a medium for the slurry.

The slurry of the organic polymer particles also contains an anionic surfactant such as sodium dodecylbenzenesulfonate or sodium lauryl sulfate, a nonion surfactant such as polyoxyethylene nonyl phenyl ether or polyethylene glycol monostearate, and the like.

The vent-type molding machine is a melt-molding machine having at least one vent. The machine may be an extrusion molding machine or an injection molding machine. At least one vent for removing water and/or the organic compound having a boiling-point of 200° C. or less should be maintained under reduced pressure. The pressure is preferably reduced to 13 KPa or less, more preferably 7 KPa or less, and most preferably 4 KPa or less.

The polyester films of the Invention Groups I to III contain the polyester resin compositions of Invention Groups I to III, respectively.

The laminated polyester films of the Invention Groups I to III each include a plurality of layers, at least one of which is composed of a corresponding polyester resin composition. The laminate structures including layers composed of the polyester resin compositions of the present invention and layers composed of other polyester resin compositions can provide laminated films having all the characteristics of these layers.

The polyester film of the present invention or the layer, which is included in the laminated polyester film of the present invention and composed of the polyester resin composition of the present invention, may be composed of the polyester resin composition alone or may be composed of a mixture of another polyester resin composition and 1 wt % or more of the polyester resin composition of the present invention. Use of such a mixture is also preferable from the standpoints of productivity and increasing the heat resistance.

(Invention Groups I and II)

The polyester resin compositions of the Invention Groups I and II each contain 30 ppm or less of antimony, as is described above. Even when a film composed of such a polyester resin composition is laminated with films composed of a polyester containing more than 30 ppm of antimony on a weight basis, the amount of the antimony as a whole film can be reduced. Thus, it is preferable to use the polyester resin composition in the laminated polyester film.

The laminated polyester films of the Invention Groups I and II are suitable for magnetic recording medium applications. In such a case, at least one surface of the recording medium is preferably a layer composed of the polyester resin composition of Invention Groups I and II. By using the polyester resin compositions of the Invention Groups I and II, a film having reduced numbers of coarse projections and flaws, excellent surface quality, and high slidability can be obtained. Such a film can withstand stringent film surface property requirements for magnetic recording media.

Next, a method for producing a polyester film by melt extrusion is explained as an example of polyester film production processes.

A polyester resin composition is first prepared. The polyester resin composition is preliminarily dried, if necessary, in hot blast or under vacuum, and fed to a single- or twin-shaft melt extruder.

In the extruder, the resin is melted by heating at a melting temperature of higher and extruded at a uniform extrusion output by use of gear pump and the like. Debris and degenerated resin are filtered off. The resin is then molded using a die, such as a T-die, and discharged.

In order to make a laminated film, for example, a technique of laminating polyester resins fed from two or more extruders via different channels using a feed block equipped with rectangular laminating unit, a static mixer, a multimanifold die, or the like may be used. Examples of the static mixer include a pipe mixer and a square mixer. From the standpoint of uniform lamination, a square mixer is preferably used.

The sheet having a single or multilayered structure discharged from the die is transferred onto a cooling unit, such as a casting drum, and cooled and solidified to obtain a casting film. When the sheet is transferred onto the cooling unit, it is preferable to apply electrostatic force to the sheet using wire-type, tape-type, needle-type, or knife-type electrodes so that the sheet closely contact onto the cooling unit (electrostatic casting) to conduct rapid cooling and solidification.

The casting film is an unstretched film. The casting film may be biaxially stretched depending on usage so as to prepare an oriented polyester film. Biaxial stretching refers to stretching in longitudinal and transversal directions. The stretching may be sequentially or simultaneously conducted in the two directions. Moreover, the film may be stretched again in the longitudinal and/or transversal direction.

Here, "longitudinal stretching" refers to stretching that orients, the molecules of the film in the longitudinal direction. For example, the film is longitudinally stretched by a difference in peripheral velocity of the rollers. The stretching may be conducted at one stage or at two or more stages using a plurality of sets of rollers. The stretching ratio is preferably 2 to 15, preferably 2.5 to 7, and most preferably 5 or less.

The surface of the film after longitudinal stretching may be coated, for example, using a gravure coater, a metering bar coater, or the like to form an readily adhesive layer, a easy sliding layer, a particle layer, or the like. The coating may be performed between the longitudinal stretching and the transversal stretching, before or after the stretching, either in-line or off-line.

The "transversal stretching" refers to stretching that orients the molecules of the film in the transversal direction. For example, the film is transferred and stretched in the transversal direction in a tenter while holding the two ends of the film with clips. The stretching ratio is preferably 2 to 10, and more preferably 5 or less.

Simultaneous biaxial stretching may be performed by simultaneously stretching the film in the longitudinal and transversal directions while being transferred with two ends being held with clips in a tenter.

The biaxially stretched film is preferably heated in a tenter at a temperature in the range of from the stretching temperature to the melting point so as to impart flatness and dimensional stability to the film. After heating, the film is slowly and uniformly cooled to room temperature, and wound. The heating temperature is preferably in the range of 120° C. to 240° C. from the standpoints of flatness and dimensional stability.

Since the polyester films of the Invention Groups I to III rarely contain debris, the surface flatness thereof is high. The average roughness Ra of the film surface is preferably in the range of 0.5 to 30 nm, more preferably 1 to 20 nm, and most preferably 1 to 10 nm.

The polyester films and the laminated polyester films of the Invention Groups I to III have a low average roughness at the film surface and are suitable as base films of magnetic recording media. In other words, magnetic recording media of the Invention Groups I to III include the laminated polyester films or the polyester films of the Invention Groups I to III, respectively. They are particularly suitable as magnetic recording media for computer data recording and digital video tapes that require high recording densities.

(Invention Group III)

According to the Invention Group III, satisfactory hue (b value) can be yielded, debris can be reduced, and thermal stability during melting is high. Thus, the invention is suitable for fiber applications, packaging applications, and optical material applications.

EXAMPLES

The present invention will now be described in further detail by way of Examples below.

(Measurement Methods)

Example 1 to 14 and Comparative Examples 1 to 5

(1.1) Titanium Content, Phosphorus Content, Antimony Content, and the Like in the Polyester Resin Composition Eight grams of a polyester resin composition was melted and molded to prepare a tabular sample. The intensity of fluorescent X-ray was measured with a fluorescent X-ray analyzer, Model 3270 produced by Rigaku Corporation. The observed value was compared with calibration curves preliminarily prepared using samples compositions of which were known, and the content of each element was determined by conversion.

(1.2) The Number of Coarse Debris in the Polyester Resin Composition (the Number Density of Titanium-Containing Particles)

Samples were prepared and measured by the following processes.

(1.2.1) Making Preparations

Polyester chips were washed with diluted hydrochloric acid, and then with purified water. On a slide glass, 0.2 mg of sample taken from these polyester chips was placed and melted at 280° C. A cover glass was placed thereon to sandwich the sample. The sample interposed between the slide glass and the cover glass was in a stretched state. The cover glass was then separated from the slide glass by sliding while being heated to 280° C., and cooled at room temperature to obtain a preparation including the cover glass and a polymer thin film disposed on the cover glass. The polymer thin film on the preparation was incised with a sharp razor so as to form a grid of 10 rows×10 columns, i.e., a total of 100 sections.

(1.2.2) Measurement of Particles with an Optical Microscope

An optical microscope, MetaloPlan, produced by Leitz Inc., was used. The magnification of the object lens of the optical microscope was set to 32×, dark field inspection was conducted, and the resulting image was input to a high-resolution monitor of an image analyzer. Since the object lens had high magnification and the depth of focus was small, adjusting the focus to the top face allowed observation of the top surface layer about 1 µm in depth.

The optical microscope was connected to a high-resolution personal image analysis system, PIAS-IV produced by Pias Co., Ltd. The observation magnification was set to 1,560× on the monitor. A monochrome image was input, and the input image was binarized to conduct brightness conversion. Here, the brightness was adjusted by adjusting the diaphragm of the optical microscope, for example, so that the average brightness was 183 (blank) when inspection was conducted without setting any sample and that the brightness indicating the density level was 160 when a sample was set.

From the binarized image, the diameters of equivalent circles of dark portions corresponding to the particles were determined as particle diameters. The number of the particles having a diameter of 1 µm or more was counted, and the positions of such particles were identified using the grid.

(1.2.3) Confirming the Presence of Titanium

The polymer thin film on the preparation after the observation described in (1.2.2) was subjected to plasma ashing and carbon deposition. The sections of the grid in which the presence of the particles having a diameter of 1 µm or more was observed with the optical microscope were inspected by SEM-XMA to determine the presence of titanium in these particles.

The number of particles having a diameter of 1 µm or more and containing titanium in 0.02 mg of a polymer was defined as the particle number density.

(1.3) Specific Volume Resistivity of the Melted Resin Composition

A resin composition was vacuum dried, placed in a test tube having an inner diameter of 50 mm, and melted at a film-making temperature (280° C.) in a nitrogen atmosphere. A pair of copper electrodes was inserted to the melted resin, and DC voltage was applied to the resin. The specific volume resistivity [ρ] of the melted resin was determined by the following equation (unit: Ω·cm)

$$[\rho]=(V\times S)/(I\times D)$$

where V is an applied voltage (V), S is the area of electrodes (cm$^2$), I is a current value (A), and D is the distance between the electrodes (cm).

(4) Cast Surface Quality

At least 10 m$^2$ of the cast sheet was exposed to light, and the reflected light was observed to determine the presence of surface irregularities, such as craters. The sheet was evaluated good (○) when no irregularity was observed, fair (Δ) when irregularities were observed in part of the surface or were shallow, i.e., having a depth of less than 0.1 µm, such that the irregularities would vanish by stretching, and poor (x) when irregularities were observed over the entire surface.

(1.5) Surface Roughness Ra

Surface roughness was measured according to Japanese Industrial Standards (JIS) B-0601.

Measurement was conducted with a precision thin-film step analyzer, ET-10 produced by Kosaka Laboratory, Ltd., equipped with a stylus having a tip radius of 0.5 μm, at a stylus force of 5 mg, sampling length of 1 mm, and a cutoff value of 0.08 mm.

(1.6) Drop-Out Characteristics

Using a commercially available Hi-8 VTR, a 4.4 MHz signal was supplied from a TV sample signal generator, and the number of dropouts in which the attenuation and the length of the regenerative signal was −16 dB or more and 15 microseconds or more, respectively, was counted with a drop-out counter. A cycle of three-minutes of playing/rewinding at 25° C. and 65% RH was repeated 100 times, and then the number of dropouts occurred during the three minutes of playing was converted to a value per minute. The drop-out characteristics were evaluated as follows:

0 to 15/min: Excellent (pass)
16 to 30/min: Good (pass)
31 or more/min: Not good (fail)

Examples 15 to 19, Reference Examples 1 to 3, and Comparative Examples 6 and 7

(2.1) Titanium Content, Phosphorus Content, and Antimony content in the polyester The contents were determined as in (1.1) above.

(2.2) Average Particle Diameter of Organic Polymer Particles

Determination was conducted by dynamic light scattering using PAR-III produced by Otsuka Electronics Co., Ltd.

(2.3) The Ratio of the Number of the Coarse Particles Having a Diameter at Least Twice the Average Diameter in the Organic Polymer Particles (2.3.1) Measurement Using a Slurry A slurry containing 20 wt % of organic polymer particles in water as medium was diluted 1,000-fold with deionized water, and the number of the coarse particles having a diameter at least twice the average diameter was counted using FPIA-2100 produced by Sysmex Corporation. The total weight of the particles were calculated based on the weight of the sample used for measurement and divided by the density of the organic polymer particles (about 1 g/cm$^3$ for each example) to obtain the total number of the particles. The number of the coarse particles was divided by the total number of the particles to determine the ratio of the coarse particles having a diameter at least twice the average diameter in the organic polymer particles.

(2.3.2) Measurement Using a Resin Composition

To 0.1 g of a resin composition containing organic polymer particles, 10 mL of orthochlorophenol was added and dissolved at 100° C. for 30 minutes under stirring. The resulting solution was left to stand at room temperature until the solution was cooled to normal temperature. Subsequently, the solution was diluted 5 fold or more in dichloromethane, and the number of coarse particles having a diameter at least twice the average diameter was determined with FPIA-2100 produced by Sysmex Corporation. Subsequently, the same calculation was conducted as in (2.3.1).

(2.4) Intrinsic Viscosity of the Polymer ([η] (dL/g))

The intrinsic viscosity of the polymer was measured at 25° C. using orthochlorophenol as a solvent.

(2.5) Contamination of Casting Drums and Preheat Rollers

Prior to film making, a casting drum, preheat rollers, and their peripheral areas were thoroughly cleaned. The state of contamination 48 hours after initiation of the film-making was observed with human eyes. The rating "⊙" was given when the same cleaned state was maintained as before the film making, the rating "○" was given when no contamination was easily recognizable, the rating "Δ" was given when slight contamination was observed but operation was continuable, and the rating "x" was given when thick layers of contaminants were deposited and cleaning or replacement were necessary.

(2.6) Number of Coarse Projections in the Film Surface

Two films of the same EXAMPLE or COMPARATIVE EXAMPLE were superimposed on each other so that 100 cm$^2$ of the measuring face came into contact with each other. The two films were closely contact onto each other by electrostatic force by applying a voltage of 5.4 kV. The coarse projections were detected from Newton's rings generated by interference of light with the coarse projections between the two films. The light source was a halogen lamp equipped with a 564-nm band pass filter. Newton's rings indicate the height of the coarse projections. The height of a coarse projection showing two or more rings is at least 0.5 μm larger by reason of the wavelength of the light.

(2.7) Flaws in Film Surface

A biaxially stretched film 48 hours after initiation of continuous film making was examined as a sample of 165 cm in width and 20 m in length subjected to transversal stretching and heating in a tenter. The film was visually examined under transmitted light, and the number of flaws found in the surface was counted. The rating poor ("x") was given when the number of flaws was 10 or more and the film cannot withstand practical use; the rating fair ("Δ") was given when the number of flaws was 3 to 9 but the film was still usable despite the low surface quality; the rating good ("○") was given when the number of flaws was 1 to 2 and the surface quality was high; and the rating excellent ("⊙") was given when no flaw was found.

Examples 20 to 30 and Comparative Examples 8 to 12

(3.1) Content of Carboxyl Terminal Groups (COOH) in the Polyester

The content of carboxyl terminal groups was determined by the method proposed by Maurice and others, set forth in Anal. Chim. Acta, 22, p. 363 (1960).

(3.2) Intrinsic Viscosity of the Polymer ([η] (dL/g))

The intrinsic viscosity was determined at 25° C. in o-chlorophenol as a solvent.

(3.3) The Titanium Content, Phosphorus Content, and Antimony Content in the Polyester The contents were determined as in (1.1) above.

(3.4) The Content of an Alkaline Metal Element in the Polyester Resin Composition The alkaline metal content was determined by flame atomic absorption spectrometry. An 8 g sample of a polyester resin composition was prepared and air-acetylene flame was used. The light source was a hollow cathode lamp. The absorption at spectrum corresponding to each element is measured with a polarized Zeeman-effect atomic absorption spectrometer, model 180-80 produced by Hitachi Ltd. The observed absorption was compared with calibration curves prepared in advance to determine the content of each element by conversion.

(3.5) The Number of Debris

Polyester chips were washed with diluted hydrochloric acid and then with purified water. A 10 mg sample was taken from the polyester chips and melted on a preparation heated to 260° C. Among about 500 fields of view that can be observed in the preparation, 10 fields of view were observed, and the number of debris having a maximum diameter of 1 μm or more was counted.

(3.6) Melt Specific Resistivity

A spacer composed of Teflon (trademark) was interposed between two copper plates functioning as electrodes. The electrodes each had an area of 22 cm², and the distance between the copper plates was 9 mm. The electrodes were immersed in a polymer melted at 290° C., and a voltage of 5,000 V was applied between the electrodes to determine the resistance from the current value.

(3.7) Thermal Stability of the Resin Composition (% BB)

In a test tube, 8 g of a resin composition was placed and heated in a nitrogen atmosphere at a pressure of 0.1 MPa at 300° C. for 10 minutes ($t_0$) and 6 hours (t) to determine the intrinsic viscosities $[\eta]_{t0}$ and $[\eta]_t$. The thermal stability was calculated from the following equation:

$$\%BB_t = (1/[\eta]_t^{(1/0.75)} - 1/[\eta]_{t0}^{(1/0.75)})$$

(3.8) Hue of the Resin Composition

Resin composition chips were analyzed with a calorimeter (SM color computer, SM-3CH) produced by Suga Test Instruments Co., Ltd., at a measuring geometry of 45°/0° using illuminant C as the light source in a 2° field of view to determine Hunter values for L, a, and b.

(3.9) Castability by Electro-Pinning

A DC voltage of 6 kV was applied between the electrode installed above the melt-extruded film and a rotating cooling unit while the casting rate was increased. The castability was determined based on the casting rate at which the electro-pinning became nonuniform according to the following standards (rating B or higher was assumed as "pass")

| | |
|---|---|
| 60 m/min< | S |
| 50 to 60 m/min | A |
| 40 to 50 m/min | B |
| 30 to 40 m/min | C |
| <30 m/min | D |

(3.9) Numbers H1 and H2 of Coarse Projections in the Film

The numbers were determined by observation of Newton's rings as in (2.6) above. The number of coarse projections that yielded a single Newton ring was defined as H1 and the number of coarse projections that yielded two or more Newton rings was defined as H2.

Note that when determination in the above-described measurement area is difficult, the measurement area may be adequately changed, and the number may then be converted to a 100-cm² equivalent. (For example, the measurement area may be changed to 1 cm², and the results obtained by inspecting 50 fields of view may be converted to a 100-cm² equivalent.)

If the above-mentioned technique is difficult, the number of projections having a height of 0.28 μm or more and the number of projections having a height of 0.56 μm or more may be counted using a 3D roughness meter (SE-3AK, produced by Kosaka Laboratory, Ltd.; the measurement may be carried out 50 times while scanning the film in the transversal direction under the following conditions: stylus tip radius: 2 μm; stylus load: 0.07 g; measurement area: 0.5 mm (width)× 15 mm (length), (pitch: 0.1 mm); and cutoff value: 0.08 mm), and then the results may be converted to 100-cm² equivalents. If necessary, a known device for counting the number of projections in the film surface, such as an atomic force microscope (AFM) or a four-detector SEM, may be used in combination.

[Catalyst A: Titanium Citrate Chelate Compound]

In a 3 L flask equipped with a stirrer, a condenser, and a thermometer, hot water (371 g) was charged, and citric acid monohydrate (532 g, 2.52 mol) was dissolved therein. While stirring the solution, titanium tetraisopropoxide (288 g, 1.00 mol) was gradually added to the solution with a dropping funnel. The resulting mixture was heated for 1 hour and refluxed to yield a clouded solution. Subsequently, an isopropanol/water mixture was distilled away under reduced pressure. The resulting liquid incorporating the products was cooled to a temperature lower than 70° C., and a 32 wt % aqueous solution of NaOH (380 g, 3.04 mol) was gradually added to this liquid while stirring the liquid using a dropping funnel. The products were separated by filtration, combined with ethylene glycol (504 g, 80 mol), and heated under reduced pressure to remove isopropanol/water. A slightly clouded pale yellow product (Ti content: 3.85 wt %) was obtained as a result. The product was diluted in ethylene glycol to prepare an ethylene glycol solution containing 1 wt % of a titanium compound. This titanium citrate chelate compound was used as a catalyst A.

[Catalyst B: Titanium Lactate Chelate Compound]

To a 2 L flask equipped with a stirrer, a condenser, and a thermometer and charged with titanium tetraisopropoxide (285 g, 1.00 mol), ethylene glycol (218 g, 3.51 mol) was gradually added using a dropping funnel under stirring. The speed of addition is adjusted so that the content of the flask was heated to about 50° C. by the reaction heat. The reaction mixture was stirred for 15 minutes, and an 85 wt % aqueous solution of ammonium lactate (252 g, 2.00 mol) was fed to the reaction flask. A transparent pale yellow product (Ti content: 6.54 wt %) was obtained as a result. This product was diluted in ethylene glycol to prepare an ethylene glycol solution containing 1 wt % of a titanium compound. This titanium lactate chelate compound was used as a catalyst B.

[Catalyst C: Titanium Alkoxide Compound]

To a 2 L flask equipped with a stirrer, a condenser, and a thermometer and charged with titanium tetraisopropoxide (285 g, 1.00 mol), ethylene glycol (496 μm 8.00 mol) was added using a dropping funnel under stirring. The speed of addition was adjusted so that the contents of the flask were heated to about 50° C. by the reaction heat. To the reaction flask, a 32 wt % aqueous solution of NaOH (125 g, 1.00 mol) was gradually fed using a dropping funnel to obtain a transparent yellow liquid (Ti content: 4.44 wt %) The liquid was diluted in ethylene glycol to prepare an ethylene glycol solution containing, 1 wt % of a titanium compound. This titanium alkoxide compound was used as a catalyst C.

Example 1

(Ethylene Glycol Slurry of Colloidal Silica Particles)

To 40 parts by weight of ethyl alcohol, 4 parts by weight of saturated ammonia water was added, and 4 parts by weight of tetrapentylsilicon was added under stirring to prepare colloidal silica having an average particle diameter of 0.1 μm. Subsequently, 100 parts by weight of ethylene glycol was added, and the mixture was heated to distill away ethanol and water. Ethylene glycol slurry of colloidal silica was obtained as a result.

(Preparation of Polyethylene Terephthalate Resin Composition)

Into an esterification reactor preliminarily charged with about 120 parts by weight of bis(hydroxyethyl) terephthalate and kept at 250° C., an ethylene glycol slurry of terephthalic acid, the slurry containing 100 parts by weight of high-purity terephthalic acid and 43 parts by weight of ethylene glycol, was continuously fed over four hours. Upon termination of the feeding, esterification reaction was continued for 1 hour while distilling away water. Subsequently, 120 parts by weight of esterification reaction products were transferred to a polycondensation reactor.

Into the polycondensation reactor charged with the esterification reaction products, 0.01 part by weight of ethyl diethylphosphonoacetate was fed, and then 0.03 part by weight of magnesium acetate tetrahydrate and the catalyst C described above in an amount of 5 ppm in terms of titanium were added. The ethylene glycol slurry of colloidal silica described above was added so that the particle density in the polymer was 0.1%.

Subsequently, while stirring the resulting lower polymer, the reaction system was gradually heated from 250° C. to 285° C. while the pressure was reduced to 100 Pa. When a predetermined stirring torque was reached, the reaction system was nitrogen-purged to return the pressure to normal, thereby terminating the polycondensation reaction.

The resulting resin composition was discharged in strands into cold water. The strands were immediately cut to prepare pellets.

The specific volume resistivity of the pellets when melted (280° C.) was 80 MΩ·cm (8×10$^7$ Ω·cm)

(Preparation of Polyester Films)

The pellets of the polyethylene terephthalate resin composition described above were dried in a vacuum drier and fed to an extruder.

In the extruder, the polyethylene terephthalate resin composition was melted at 280° C., sent through a gear pump and a filter, and fed to a T-die to prepare a sheet. The sheet was rapidly cooled and solidified on a casting drum having a surface temperature maintained at 20° C. while applying electrostatic charge with wire electrodes.

This cast film was heated with rollers having a surface temperature of 90° C., and stretched 3.0 fold in the longitudinal direction.

Next, the film was introduced into a tenter, preheated with hot blast at 100° C., and stretched 3.3 fold in the transversal direction. In the same tenter, the film was heated by hot blast at 200° C., slowly cooled to room temperature, and wound. The thickness of the resulting film was 10 μm.

(Preparation of a Magnetic Recording Medium)

On a surface of the film, a magnetic coating composition and a back coating composition, compositions of which are described below, were applied.

(Magnetic coating composition)

| | |
|---|---|
| Ferrous metal ferromagnetic powder | 100 parts by weight |
| A vinyl chloride/vinyl acetate copolymer | 10 parts by weight |

-continued

| | |
|---|---|
| A polyurethane elastomer | 10 parts by weight |
| Polyisocyanate | 5 parts by weight |
| Lecithin | 1 part by weight |
| Methyl ethyl ketone | 75 parts by weight |
| Methyl isobutyl ketone | 75 parts by weight |
| Toluene | 75 parts by weight |
| Carbon black | 2 parts by weight |
| Lauric acid | 1.5 parts by weight |
| (Back coating composition) | |
| Carbon black | 100 parts by weight |
| Polyester polyurethane resin | 100 parts by weight |
| Methyl ethyl ketone | 500 parts by weight |
| Toluene | 500 parts by weight |

The film was subjected to calendering using a small calendering machine (styrol/nylon roll) for testing, at 70° C. and a linear load of 2,000 N/cm. Subsequently, the compositions were cured for 48 hours at 70° C. The original tape was cut to a width of 8 mm and assembled into a cassette to prepare a cassette tape.

Examples 2 to 4

A polyethylene terephthalate resin composition, a film, and a magnetic tape were prepared as in EXAMPLE 1 except that the type and the amount of titanium catalyst, the type and the amount of the alkaline earth metal compound (in EXAMPLE 2, magnesium acetate tetrahydrate as in EXAMPLE 1, and in EXAMPLE 4, calcium acetate monohydrate were used), and the amount of the ethyl diethylphosphonoacetate were changed.

Comparative Example 1

A polyester resin, a film, and a magnetic tape were prepared as in EXAMPLE 1, except that the amount of the titanium catalyst added was changed to 60 ppm on a weight basis in terms of titanium.

Because of the titanium content exceeding 50 ppm, large amounts of debris were contained in the resin, and the magnetic tape frequently suffered from drop-outs.

Comparative Example 2

Preparation of polyethylene terephthalate resin composition etc., was attempted as in EXAMPLE 1 but with 0.2 ppm of a titanium catalyst on a weight basis in terms of titanium. However, a resin having a sufficiently high degree of polymerization for forming films was not obtained.

Comparative Example 3

A polyethylene terephthalate resin composition was prepared as in EXAMPLE 1 except that antimony trioxide was used as the polymerization catalyst instead of the catalyst C, in an amount of 200 ppm on a weight basis in terms of antimony and that magnesium acetate tetrahydrate was not used.

An attempt was made to make a film as in EXAMPLE 1 using this resin composition; however, the castability was poor, and crater-shaped flaws were found in the film surface. This film was not sufficient to be processed into a magnetic tape.

Example 5

(Resin Composition Prepared in the Presence of a Titanium Catalyst)

A polyethylene terephthalate resin composition was prepared as in EXAMPLE 2 but without adding any colloidal silica.

(Resin Composition Prepared in the Presence of a Antimony Catalyst)

The polyester resin prepared in COMPARATIVE 3 was used.

(Preparation of a Laminated Polyester Film)

The two polyethylene terephthalate resin compositions above were independently fed to separate extruders, extruded, and laminated to form a two-layered composite using a feed block. The composite was fed to a T-die and formed into a sheet. The sheet was rapidly cooled and solidified on a casting drum having a surface temperature maintained at 20° C. while applying electrostatic charge by wire electrodes.

The cast film was heated with rollers having a surface temperature of 90° C., and stretched 3.0 fold in the longitudinal direction.

Subsequently, the film was introduced into a tenter, preheated in a hot blast at 100° C., and stretched 3.3 fold in the transversal direction. In the same tenter, the film was heated in a hot blast at 200° C., slowly cooled to room temperature, and wound. The lamination ratio of the film was 90 wt % the resin prepared in the presence of the titanium catalyst and 10 wt % the resin prepared in the presence of the antimony catalyst.

The laminated film was processed into a magnetic tape, as in EXAMPLE 1, by applying magnetic compositions on a surface composed of the resin prepared in the presence of the titanium catalyst.

Example 6

A polyester resin composition, a film, and a magnetic tape were prepared as in EXAMPLE 1 except that the phosphorus compound was changed from ethyl diethylphosphonoacetate to trimethylphosphoric acid in an amount of 10 ppm on a weight basis in terms of phosphorus.

Example 7

A polyester resin composition, a film, and a magnetic tape were prepared as in EXAMPLE 1 except that the phosphorus compound was changed from ethyl diethylphosphonoacetate to phosphoric acid in an amount of 10 ppm on a weight basis in terms of phosphorus.

Example 8

A polyester resin composition, a film, and a magnetic tape were prepared as in EXAMPLE 1 except that the amount of the catalyst C was changed to 35 ppm on a weight basis in terms of titanium.

Examples 9 to 12

A polyester resin composition, a film, and a magnetic tape were prepared as in EXAMPLE 3 except that the amount of the magnesium acetate tetrahydrate added before the polycondensation was changed respectively.

Examples 13 and 14 and Comparative Example 4

A polyester resin composition, a film, and a magnetic tape were prepared as in EXAMPLE 2 except that the amount of ethyl diethylphosphonoacetate added was changed respectively.

Comparative Example 5

An attempt was made to prepare a polyester resin as in EXAMPLE 2 except that the amount of the ethyl diethylphosphonoacetate added was changed. However, the polymerization rate was excessively low, and the resulting resin did not have a sufficient degree of polymerization for film production.

The results of EXAMPLES 1 to 14 and COMPARATIVE EXAMPLES 1 to 5 are shown in Tables 1-1 and 1-2.

Note that in these tables, the content of each element in EXAMPLE 5 is relative to the entirety of the film. Moreover, in EXAMPLE 5, the surface composed of the resin composition prepared in the presence of the titanium catalyst was evaluated as to its film properties.

TABLE 1-1

| | Composition of polyester resin | | | | |
|---|---|---|---|---|---|
| | Ti content (ppm) | Type of Ti catalyst | Alkaline earth content (type/ppm) | P content (ppm) | Sb content (ppm) |
| EXAMPLE 1 | 5 | C | Mg/30 | 10 | 0 |
| EXAMPLE 2 | 15 | B | Mg/30 | 10 | 0 |
| EXAMPLE 3 | 5 | A | None | 10 | 0 |
| EXAMPLE 4 | 2 | A | Ca/100 | 35 | 0 |
| EXAMPLE 5 | 13.5 | B | Mg/27 | 10 | 20 |
| EXAMPLE 6 | 5 | C | Mg/30 | 10 | 0 |
| EXAMPLE 7 | 5 | C | Mg/30 | 10 | 0 |
| EXAMPLE 8 | 35 | C | Mg/30 | 10 | 0 |
| EXAMPLE 9 | 5 | A | Mg/15 | 10 | 0 |
| EXAMPLE 10 | 5 | A | Mg/60 | 10 | 0 |
| EXAMPLE 11 | 5 | A | Mg/70 | 10 | 0 |
| EXAMPLE 12 | 5 | A | Mg/100 | 10 | 0 |
| EXAMPLE 13 | 15 | B | Mg/30 | 1 | 0 |
| EXAMPLE 14 | 15 | B | Mg/30 | 80 | 0 |
| COMPARATIVE EXAMPLE 1 | 60 | C | Mg/30 | 10 | 0 |
| COMPARATIVE EXAMPLE 2 | 0.2 | C | Mg/30 | 10 | 0 |
| COMPARATIVE EXAMPLE 3 | 0 | — | None | 10 | 200 |
| COMPARATIVE EXAMPLE 4 | 15 | B | Mg/30 | 0 | 0 |
| COMPARATIVE EXAMPLE 5 | 15 | B | Mg/30 | 120 | 0 |

TABLE 1-2

| | Polyester resin properties | | Film properties | | |
|---|---|---|---|---|---|
| | Specific volume resistivity when melted (MΩ·cm) | No. of particles (No./0.02 mg) | Castability | Ra (nm) | Number of drop-outs (pass or fail/No.) |
| EXAMPLE 1 | 80 | 3 | ◯ | 6 | Pass/3 |
| EXAMPLE 2 | 50 | 50 | ◯ | 12 | Pass/12 |
| EXAMPLE 3 | 500 | 7 | Δ | 5 | Pass/6 |
| EXAMPLE 4 | 40 | 2 | ◯ | 10 | Pass/10 |
| EXAMPLE 5 | — | — | ◯ | 10 | Pass/10 |

TABLE 1-2-continued

| | Polyester resin properties | | Film properties | | |
|---|---|---|---|---|---|
| | Specific volume resistivity when melted (MΩ·cm) | No. of particles (No./0.02 mg) | Cast-ability | Ra (nm) | Number of drop-outs (pass or fail/No.) |
| EXAMPLE 6 | 85 | 15 | ○ | 13 | Pass/16 |
| EXAMPLE 7 | 90 | 30 | ○ | 14 | Pass/18 |
| EXAMPLE 8 | 75 | 90 | ○ | 17 | Pass/25 |
| EXAMPLE 9 | 250 | 10 | ○ | 12 | Pass/10 |
| EXAMPLE 10 | 40 | 15 | ○ | 13 | Pass/15 |
| EXAMPLE 11 | 30 | 55 | ○ | 15 | Pass/19 |
| EXAMPLE 12 | 10 | 80 | ○ | 16 | Pass/24 |
| EXAMPLE 13 | 30 | 85 | ○ | 17 | Pass/26 |
| EXAMPLE 14 | 800 | 92 | Δ | 17 | Pass/28 |
| COMPARATIVE EXAMPLE 1 | 60 | 260 | ○ | 20 | Fail/50 |
| COMPARATIVE EXAMPLE 2 | — | — | — | — | — |
| COMPARATIVE EXAMPLE 3 | 1000 | 0 | x | — | — |
| COMPARATIVE EXAMPLE 4 | 30 | 110 | ○ | 20 | Fail/35 |
| COMPARATIVE EXAMPLE 5 | — | — | — | — | — |

Example 15

(Preparation of a Polyethylene Terephthalate Resin Composition)

Into an esterification reactor preliminarily charged with about 120 parts by weight of bis(hydroxyethyl) terephthalate and kept at 250° C. and a pressure of $1.2 \times 10^5$ Pa, an ethylene glycol slurry of terephthalic acid, the slurry containing 100 parts by weight of high-purity terephthalic acid and 43 parts by weight of ethylene glycol, was continuously fed over four hours. Upon termination of the feeding, esterification reaction was continued for 1 hour. Then, 120 parts by weight of the esterification reaction products were transferred to a polycondensation reactor.

Into the polycondensation reactor charged with the esterification reaction products, 10 ppm of an ethylene glycol solution of triethylphosphonoacetate in terms of phosphorus was fed. Ten minutes later, an ethylene glycol solution of magnesium acetate tetrahydrate in an amount of 39 ppm in terms of magnesium relative to a polymer to be obtained and a 1 wt % ethylene glycol solution of titanium citrate chelate compound (catalyst A) in an amount of 5 ppm in terms of titanium relative to the polymer to be obtained were added to the reaction system.

Subsequently, while stirring the resulting lower polymer at 30 rpm, the reaction system was gradually heated from 250° C. to 285° C. while the pressure was reduced to 40 Pa. The time taken until the final temperature and final pressure were reached in heating and pressure reduction was set to 60 minutes. When a predetermined stirring torque was reached, the reaction system was nitrogen-purged to return the pressure to normal, thereby terminating the polycondensation reaction. The time taken from the initiation of pressure reduction to reaching of the target stirring torque was 3 hours.

The resulting resin composition was discharged in strands into cold water. The strands were immediately cut to prepare pellets.

The intrinsic viscosity of the resulting polymer was 0.65. The content of titanium derived from the titanium catalyst in the resin composition was 5 ppm, the phosphorus content was 10 ppm, and the antimony content was 0 ppm.

(Preparation and Addition of Organic Polymer Particles)

Organic polymer particles were prepared by a seed emulsion polymerization technique, in which seed particles having a significantly narrow particle size distribution were obtained by conducting seed polymerization in multiple stages. Using these seed particles, seed emulsion polymerization was conducted. Subsequently, circulation filtration was conducted using a filter, which had an absolute filtration accuracy of twice the average particle diameter and was produced by Pall Corporation, for 20 passes to prepare an aqueous slurry of a vinylbenzene-divinylbenzene copolymer organic polymer particles having an average particle diameter of 0.3 μm, a degree of cross-linking of 80%, and a ratio of coarse particles of 0.001%.

The above-described pellets were melted in a vent-type twin-shaft extruder, and the organic polymer-particles were added thereto so that the content of the organic polymer particles in the resin composition to be obtained becomes 2 wt %.

After the organic polymer particles were added, the resin composition was melt-extruded at a resin composition temperature of 280° C. while maintaining the vent port of the extruder under a vacuum of 1 KPa. The extruded composition was cut to prepare pellets of the polyethylene terephthalate resin composition containing the organic polymer particles. The intrinsic viscosity of the polymer was 0.60.

(Preparation of a Laminated Polyester Film)

Twenty parts by weight of a resin composition containing the organic polymer particles described above and 80 parts by weight of a resin composition to which no organic polymer particle was added were dried separately, and fed to separate single-shaft extruders. The compositions were combined using a T-die to prepare a two-layer structure in which the ratio of the two layers was 5:1. The two-layer structure was melt-extruded at 290° C. to prepare a sheet. The sheet was biaxially stretched at a stretching temperature of 120° C. to prepare a laminated film having a thickness of 6 μm. The properties of this laminated film were investigated. The film showed satisfactory surface quality.

Example 16

A polyester resin composition and a film were prepared as in EXAMPLE 15 except for the following. In preparing the polyethylene terephthalate resin composition, 95 parts by weight of high-purity terephthalic acid and 5 parts by weight of 5-sodium sulfoisophthalic acid were used instead of 100 parts by weight of high-purity terephthalic acid; the amount of the catalyst A added was changed to 10 ppm in terms of titanium; and the organic polymer particles were surface-treated by adding 1 wt % of polyvinyl pyrrolidone relative to the organic polymer particles to an aqueous slurry of the organic polymer particles and stirring the resulting mixture for 3 hours at normal temperature.

Example 17

A polyester resin composition and a film were obtained as in EXAMPLE 15 except that 0.5 μm silicone particles were used as the organic polymer particles.

Example 18

A polyester resin composition and a film were prepared as in EXAMPLE 15 except that the catalyst B was used instead of the catalyst A, the amount of triethylphosphonoacetate added was changed to 20 ppm in terms of phosphorus, the average particle diameter of vinylbenzene-divinylbenzene organic polymer particles was changed to 0.8 μm, and the ratio of the coarse particles was changed to 0.005%.

Example 19

A polyester resin composition and a film were obtained as in EXAMPLE 15, except that the catalyst C was used instead of the catalyst A, the amount of triethylphosphonoacetate added was changed to 40 ppm in terms of phosphorus, the average particle diameter of vinylbenzene-divinylbenzene organic polymer particles was changed to 2.7 μm, and the ratio of the coarse particles were changed to 0.01%.

Comparative Example 6

A polyester resin composition and a film were obtained as in EXAMPLE 15, except that antimony trioxide in an amount of 200 ppm relative to the resulting polymer in terms of antimony was added instead of the catalyst A. Although the polymerization reactivity was satisfactory, contamination of the casting drum and preheat rollers occurred during film-making. Moreover, the resulting film had significantly increased flaws and coarse projections in its surface.

Reference Example 1

A polyester resin composition and a film were obtained as in EXAMPLE 15, except that the ratio of the coarse particles of vinylbenzene-divinylbenzene was changed to 0.02%. The flaws in the film surface increased; in particular, the number of coarse projections was as high as 300/100 Cm².

Reference Example 2

A polyester resin composition and a film were obtained as in EXAMPLE 15, except that the amount of the triethylphosphonoacetate was changed to 20 ppm in terms of phosphorus, the average particle diameter of the vinylbenzene-divinylbenzene organic polymer particles was changed to 5 μm, and the ratio of the coarse particles was 0.005%. The flaws in the film surface increased; in particular, the number of coarse projections was as high as 250/100 cm².

Reference Example 3

An attempt was made to prepare a polyester resin composition as in EXAMPLE 15 but with 60 ppm of triethylphosphonoacetate in terms of phosphorus. However, the particles could not be mixed, and the resulting product did not have a degree of polymerization suitable for film production.

Comparative Example 7

A polyester resin composition and a film were prepared as in EXAMPLE 15 except that the amount of the catalyst A added was changed to 100 ppm in terms of titanium. The number of coarse projections in the film increased to 200 per square centimeter.

The results of EXAMPLES 15 to 19, REFERENCE EXAMPLES 1 to 3, and COMPARATIVE EXAMPLES 6 and 7 are shown in Tables 2-1 to 2-3.

TABLE 2-1

| | Composition of polyester resin | | | |
|---|---|---|---|---|
| | Type of catalyst | Ti content (ppm) | P content (ppm) | Sb content (ppm) |
| EXAMPLE 15 | A | 5 | 10 | 0 |
| EXAMPLE 16 | A | 10 | 10 | 0 |
| EXAMPLE 17 | A | 5 | 10 | 0 |
| EXAMPLE 18 | B | 5 | 20 | 0 |
| EXAMPLE 19 | C | 5 | 40 | 0 |
| COMPARATIVE EXAMPLE 6 | — | 0 | 10 | 200 |
| COMPARATIVE EXAMPLE 7 | A | 100 | 10 | 0 |
| REFERENCE EXAMPLE 1 | A | 5 | 10 | 0 |
| REFERENCE EXAMPLE 2 | A | 5 | 20 | 0 |
| REFERENCE EXAMPLE 3 | A | 5 | 60 | 0 |

TABLE 2-2

| | Properties of organic polymer particles contained in the polyester resin composition | | |
|---|---|---|---|
| | Type of organic polymer particles | Average diameter (μm) | Ratio of coarse particles (%) |
| EXAMPLE 15 | Vinylbenzene-divinylbenzene | 0.3 | 0.001 |
| EXAMPLE 16 | Vinylbenzene-divinylbenzene | 0.3 | 0.001 |
| EXAMPLE 17 | Silicone | 0.5 | 0.001 |
| EXAMPLE 18 | Vinylbenzene-divinylbenzene | 0.8 | 0.005 |
| EXAMPLE 19 | Vinylbenzene-divinylbenzene | 2.7 | 0.010 |
| COMPARATIVE EXAMPLE 6 | Vinylbenzene-divinylbenzene | 0.3 | 0.001 |
| COMPARATIVE EXAMPLE 7 | Vinylbenzene-divinylbenzene | 0.3 | 0.001 |
| REFERENCE EXAMPLE 1 | Vinylbenzene-divinylbenzene | 0.3 | 0.020 |
| REFERENCE EXAMPLE 2 | Vinylbenzene-divinylbenzene | 5.0 | 0.005 |
| REFERENCE EXAMPLE 3 | — | — | — |

TABLE 2-3

| | Properties of film | | |
|---|---|---|---|
| | Contamination of casting drum and preheat rollers | Flaws in film surface | Coarse projections in film surface (No./100 cm²) |
| EXAMPLE 15 | ⊙ | ⊙ | 20 |
| EXAMPLE 16 | ⊙ | ○ | 30 |
| EXAMPLE 17 | ⊙ | ⊙ | 30 |
| EXAMPLE 18 | ○ | ⊙ | 50 |
| EXAMPLE 19 | ○ | ○ | 80 |
| COMPARATIVE EXAMPLE 6 | Δ | x | 200 |
| COMPARATIVE | Δ | Δ | 200 |

TABLE 2-3-continued

| | Properties of film | | |
|---|---|---|---|
| | Contamination of casting drum and preheat rollers | Flaws in film surface | Coarse projections in film surface (No./100 cm$^2$) |
| EXAMPLE 7 REFERENCE EXAMPLE 1 | Δ | Δ | 300 |
| REFERENCE EXAMPLE 2 | Δ | x | 250 |
| REFERENCE EXAMPLE 3 | — | — | — |

Example 20

(Catalyst Preparation)

To 94.95 parts by weight of ethylene glycol, 0.05 part by weight of the compound represented by the formula D above was added as a ligand compound P and dissolved by heating at 150° C. for 30 minutes. To the resulting ethylene glycol solution, 5 parts by weight of an isopropyl alcohol solution of titanium acetylacetonate as the compound α (the density of the solution was 10 wt % in terms of titanium) was added and dissolved at 150° C. for 1 hour to prepare a catalyst slurry. The titanium content in the slurry was 5,000 ppm.

(Preparation of a Polyester Resin Composition)

Using the esterification reaction products of 86 parts by weight of terephthalic acid and 39 parts by weight of ethylene glycol as a reservoir, 86 parts by weight of terephthalic acid and 39 parts by weight of ethylene glycol were added to this reservoir, and the esterification was continued at 250° C. Upon reaching the reaction rate of 97% or higher, the esterification reaction products corresponding to 86 parts by weight of terephthalic acid were transferred to a polycondensation can, and 0.1 part by weight of the above-described catalyst and 0.004 part by weight of dimethyl methylphosphonate were fed to this can The resulting mixture was transferred to a polycondensation reactor. The reaction system was gradually vacuumed while heating, and polycondensation was conducted under a reduced pressure of 133 Pa at 285° C. for 3 hours according to a conventional technique under stirring at a constant rate. A polyester composition I having an intrinsic viscosity of 0.630 was obtained as a result.

Examples 21 to 23

Polyester resin compositions II, III, and IV having intrinsic viscosities of 0.64, 0.63, and 0.64, respectively, and catalysts were prepared as in EXAMPLE 20 but with changes set forth in Table 3-1 regarding the catalyst preparation and the amount of the catalyst added.

Example 24

(Catalyst Preparation)

To 94.975 parts by weight of ethylene glycol, 0.025 part by weight of the compound represented by the formula D above was added as a ligand compound β and dissolved by heating at 150° C. for 30 minutes. To this ethylene glycol solution, 5 parts by weight of an isopropyl alcohol solution of tetrabutyl titanate as the compound α (the density of the solution being 10 wt % in terms of titanium) was added and dissolved at 150° C. for 1 hour to prepare a catalyst slurry. The titanium content in the slurry was 5,000 ppm.

(Preparation of a Polyester Resin Composition)

A polyester resin composition V having an intrinsic viscosity of 0.630 was prepared as in EXAMPLE 20 except that the above-described slurry was added as a catalyst in an amount of 0.1 part by weight and that 0.005 part by weight of dipropynyl methylphosphonate was added instead of 0.004 part by weight of dimethyl methylphosphonate.

Example 25

(Catalyst Preparation)

To 94.7 parts by weight of ethylene glycol, 0.3 part by weight of the compound represented by formula D was added as a ligand compound β at 25° C. To this ethylene glycol solution, 5 parts by weight of an isopropyl alcohol solution of titanium citrate chelate as the compound α was added (the density of the solution being 10 wt % in terms of titanium), and the mixture was mixed at normal temperature to obtain a catalyst slurry. The titanium content in the slurry was 5,000 ppm.

(Preparation of Polyester)

A polyester resin composition VI having an intrinsic viscosity of 0.63 was obtained as in EXAMPLE 20, except that 0.16 part by weight of the above-described slurry was used as the catalyst, that 0.004 part by weight of ethyl diethylphosphonoacetate was used instead of 0.004 part by weight of dimethyl methylphosphonate, and that 0.03 part by weight of magnesium acetate tetrahydrate was added.

Example 26

A polyester resin composition VII having an intrinsic viscosity of 0.64 and a catalyst were prepared as in EXAMPLE 25 except that an aqueous solution of ammonium titaniumperoxocitrate was used as the compound a.

Comparative Example 8

Using the esterification reaction products of 86 parts by weight of terephthalic acid and 39 parts by weight of ethylene glycol as a reservoir, 86 parts by weight of terephthalic acid and 39 parts by weight of ethylene glycol were added to this reservoir, and the esterification was continued at 250° C. Upon reaching the reaction rate of 97% or higher, the esterification reaction products corresponding to 86 parts by weight of terephthalic acid were transferred to a polycondensation can, and 0.0035 part by weight of tetrabutyl titanate and 0.005 part by weight of dipropyl methylphosphonate were added. The resulting mixture was transferred to a polycondensation reactor. The reaction system was gradually vacuum while heating, and polycondensation was conducted for 3 hours under a vacuum of 133 Pa at 285° C. by a conventional technique under stirring at a constant rate to prepare a polyester resin composition VIII having an intrinsic viscosity of 0.630.

Comparative Example 9

Chips of a polyethylene terephthalate resin composition IX having an intrinsic viscosity of 0.63 were prepared as in EXAMPLE 8 but without dipropynyl methylphosphonate.

Comparative Example 10

Chips of a polyethylene terephthalate resin composition X having an intrinsic viscosity of 0.63 were prepared as in COMPARATIVE EXAMPLE 8 except that 0.012 part by weight of antimony trioxide was added instead of 0.0035 part by weight of tetrabutyl titanate and 0.005 part by weight of dipropynyl methylphosphonate.

The evaluation results of EXAMPLES 20 to 26 and COMPARATIVE EXAMPLES 8 to 10 are shown in Tables 3-1 and 3-2.

TABLE 3-1

| | Catalyst | | | | | | Properties of the polymer |
|---|---|---|---|---|---|---|---|
| | Compound α | Compound β | Molar ratio (α/β) | Content (ppm in terms of metal) | Type of phosphorus compound | % BB 6 hours | η |
| EXAMPLE 20 | Titanium acetylacetonate | D | 0.009 | 5 | Dimethyl methylphosphonate | 0.91 | 0.63 |
| EXAMPLE 21 | Titanium acetylacetonate | D | 0.005 | 5 | Dimethyl methylphosphonate | 0.95 | 0.64 |
| EXAMPLE 22 | Titanium acetylacetonate | H | 0.005 | 5 | Dipropynyl methylphosphonate | 0.95 | 0.63 |
| EXAMPLE 23 | Titanium acetylacetonate | C | 0.005 | 5 | Dimethyl phenylphosphonate | 0.95 | 0.64 |
| EXAMPLE 24 | Tetrabutyl titanate | D | 0.005 | 5 | Dipropynyl methylphosphonate | 0.95 | 0.63 |
| EXAMPLE 25 | Titanium citrate chelate | D | 0.054 | 8 | Ethyl diethylphosphonoacetate | 0.95 | 0.63 |
| EXAMPLE 26 | Ammonium titaniumperoxocitrate | D | 0.054 | 8 | Ethyl diethylphosphonoacetate | 0.94 | 0.64 |
| COMPARATIVE EXAMPLE 8 | Tetrabutyl titanate | None | — | 5 | Dipropynyl methylphosphonate | 0.98 | 0.63 |
| COMPARATIVE EXAMPLE 9 | Tetrabutyl titanate | None | — | 5 | None | 1.21 | 0.63 |
| COMPARATIVE EXAMPLE 10 | Antimony | None | — | 100 | None | 1.01 | 0.63 |

TABLE 3-2

| | Hue | | No. of debris | Specific resistivity of melt | Type of polyester composition |
|---|---|---|---|---|---|
| | L | b | (No./0.02 mg) | [MΩ·cm] | |
| EXAMPLE 20 | 60.1 | 2.5 | 10 | 510 | I |
| EXAMPLE 21 | 60.2 | 2.5 | 3 | 500 | II |
| EXAMPLE 22 | 60.1 | 2.6 | 3 | 490 | III |
| EXAMPLE 23 | 60.2 | 2.7 | 3 | 490 | IV |
| EXAMPLE 24 | 60.3 | 2.5 | 3 | 500 | V |
| EXAMPLE 25 | 57.3 | 1.5 | 20 | 80 | VI |
| EXAMPLE 26 | 57.2 | 1.4 | 15 | 80 | VII |
| COMPARATIVE EXAMPLE 8 | 60.3 | 5.3 | 3 | 3 | VIII |
| COMPARATIVE EXAMPLE 9 | 60.4 | 8.6 | 3 | 3 | IX |
| COMPARATIVE EXAMPLE 10 | 56.3 | 2.5 | 120 | 120 | X |

Example 27

The polyester resin composition V was thoroughly dried and fed to an extruder. The composition was then melt-extruded onto a casting drum and rapidly cooled and solidified while applying electrostatic charge so that the extruded composition is in close contact with the drum. A single-layer unstretched film prepared thereby was stretched 3.5 fold in the longitudinal direction at 90° C. and to 3.5 fold in the transversal direction at 105° C. to prepare a polyester film having a thickness of 10 μm. The film forming ability of the composition was satisfactory. The resulting film had few coarse projections and satisfactory hue.

Example 28

The polyester resin composition III was thoroughly dried and fed to a main layer extruder of a device for making laminated films. The polyester resin composition IV was dried and fed to an auxiliary layer extruder. The compositions were melt-extruded on a casting drum via a two-layer die and rapidly cooled and solidified while applying electrostatic charges so that the extruded compositions closely contact onto the casting drum. A two-layer unstretched film, the main layer/auxiliary layer thickness ratio of which was 6/1, was obtained as a result. This unstretched film was stretched to 3.5 fold in the longitudinal direction at 90° C. and 3.5 fold in the transversal direction at 105° C. to prepare a laminated polyester film having a thickness of 8 μm (the thickness of the auxiliary layer being 1.33 μm). The film forming ability was satisfactory. The film obtained thereby had few coarse projections and satisfactory hue.

Example 29

A laminated polyester film having a thickness of 8 μm (the thickness of the auxiliary layer being 1.33 μm) was prepared as in EXAMPLE 28 except that the polyester resin composition III was used to form the main layer and the polyester resin composition V was used to form the auxiliary layer. The film forming ability was satisfactory. The film prepared thereby had few coarse projections and satisfactory hue.

Example 30

A polyester film having a thickness of 10 μm was prepared as in EXAMPLE 27 except that the polyester resin composition VI was used. The film forming ability was particularly high. The resulting film had few coarse projections and satisfactory hue.

Comparative Example 11

A polyester film having a thickness of 10 μm was prepared as in EXAMPLE 27 except that the polyester resin composition IX was used. Its castability by electro-pinning was not problematic. The film prepared thereby had few coarse projections but poor hue. Moreover, the thermal stability was poor, and the productivity was low.

Comparative Example 12

A laminated polyester film having a thickness of 8 μm (the thickness of the auxiliary layer being 1.33 μm) was prepared as in EXAMPLE 28 except that the polyester resin composition X was used to form the main layer and the polyester resin composition IX was used to form the auxiliary layer. Its castability by electro-pinning was not problematic. The film prepared thereby had many coarse projections and poor hue. Moreover, the thermal stability was low, and the productivity was low.

The evaluation of EXAMPLES 27 to 30 and COMPARATIVE EXAMPLES 11 and 12 are shown in Tables 4-1 and 4-2.

TABLE 4-1

| | Polymer composition | | No. of debris (No./0.02 mg) | % BB 6 hours | Castability by electro-pinning |
|---|---|---|---|---|---|
| | Main layer | Auxiliary layer | | | |
| EXAMPLE 27 | Polyester composition V | | 10 | 1.01 | B |
| EXAMPLE 28 | Polyester composition III | Polyester composition IV | 3 | 1.05 | B |
| EXAMPLE 29 | Polyester composition III | Polyester composition V | 3 | 1.05 | B |
| EXAMPLE 30 | Polyester composition VI | | 20 | 1.05 | S |
| COMPARATIVE EXAMPLE 11 | Polyester composition IX | | 3 | 1.31 | B |
| COMPARATIVE EXAMPLE 12 | Polyester composition X | Polyester composition IX | 60 | 1.2 | B |

TABLE 4-2

| | Hue | | No. of coarse projections | |
|---|---|---|---|---|
| | L | b | H1 (No./100 cm$^2$) | H2 (No./100 cm$^2$) |
| EXAMPLE 27 | 59.1 | 2.5 | 37 | 1 |
| EXAMPLE 28 | 59.1 | 2.6 | 19 | 1 |
| EXAMPLE 29 | 59.1 | 2.6 | 23 | 1 |
| EXAMPLE 30 | 57 | 1.5 | 45 | 1 |
| COMPARATIVE EXAMPLE 11 | 59.4 | 8.6 | 19 | 1 |
| COMPARATIVE EXAMPLE 12 | 57.3 | 5.5 | 110 | 2 |

The invention claimed is:

1. A polyester resin composition comprising, on a weight basis, 30 ppm or less of antimony, 0.5 to 50 ppm, in terms of titanium, of a titanium compound having at least one substituent selected from the group consisting of an alkoxy group and an acylate group, and 0.1 to 100 ppm, in terms of phosphorus, of ethyl diethylphosphonoacetate, wherein the number of titanium-containing particles having an equivalent circular diameter of 1 μm or more is less than 100/0.02 mg of the composition; the alkoxy group in the titanium compound is at least one functional group selected from the group consisting of a β-diketone-system functional group, a hydroxycarboxylic acid-system functional group, and a ketoester-system functional group; and the acylate group in the titanium compound is either a multivalent carboxylic acid-system functional group or a nitrogen-containing multivalent carboxylic acid-system functional group.

2. The polyester resin composition according to claim 1, wherein the titanium compound has an aliphatic alkoxy group or an aliphatic acylate group.

3. The polyester resin composition according to claim 1, wherein the molar ratio of titanium to phosphorus (Ti/P) is in the range of 0.1 to 20.

4. The polyester resin composition according to claim 1, further comprising 5 to 100 ppm of an alkaline earth metal element on a weight basis.

5. The polyester resin composition according to claim 4, comprising 15 to 60 ppm of magnesium on a weight basis.

6. The polyester resin composition according to claim 1, wherein the specific volume resistivity is in the range of $1 \times 10^6$ to $1 \times 10^9$ Ω·cm when melted.

7. A polyester film comprising the polyester resin composition according to claim 1.

8. A laminated polyester film comprising a plurality of layers at least one of which comprises the polyester resin composition according to claim 1.

9. A magnetic recording medium, comprising the laminated polyester film according to claim 8.

* * * * *